US012798921B2

(12) United States Patent
Nakashima

(10) Patent No.: US 12,798,921 B2
(45) Date of Patent: Nov. 17, 2026

(54) MEDIUM PROCESSING APPARATUS AND IMAGE FORMING SYSTEM INCORPORATING SAME

(71) Applicant: Kota Nakashima, Kanagawa (JP)

(72) Inventor: Kota Nakashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 19/069,561

(22) Filed: Mar. 4, 2025

(65) Prior Publication Data

US 2025/0296800 A1 Sep. 25, 2025

(30) Foreign Application Priority Data

Mar. 19, 2024 (JP) ................................ 2024-043939

(51) Int. Cl.
*B65H 37/04* (2006.01)
*G03G 15/00* (2006.01)

(52) U.S. Cl.
CPC ......... *B65H 37/04* (2013.01); *G03G 15/6544* (2013.01); *B65H 2301/43823* (2013.01); *B65H 2301/43827* (2013.01)

(58) Field of Classification Search
CPC ...... G03G 15/6544; G03G 2215/00852; B31F 1/07; B31F 5/02; B31F 2201/0758; B31F 2201/0779; B31F 2201/0784; B31F 2201/0754; B65H 37/04; B65H 2301/43828; B65H 2301/43823; B65H 2301/5142; B65H 2301/5162
USPC ................................ 270/58.07, 58.08, 58.09
See application file for complete search history.

(56) References Cited

U.S. PATENT DOCUMENTS

| | | | | |
|---|---|---|---|---|
| 10,654,240 | B2 * | 5/2020 | Takahashi | B65H 37/04 |
| 11,868,073 | B2 * | 1/2024 | Sasaki | G03G 15/6544 |
| 2014/0219747 | A1 | 8/2014 | Takahashi et al. | |
| 2023/0241860 | A1 | 8/2023 | Matsumoto et al. | |

FOREIGN PATENT DOCUMENTS

| | | | | |
|---|---|---|---|---|
| JP | 2004351726 A | * 12/2004 | | |
| JP | 2014-148398 A | 8/2014 | | |
| JP | 2016016973 A | * 2/2016 | | B65H 37/04 |

(Continued)

*Primary Examiner* — Leslie A Nicholson, III
(74) *Attorney, Agent, or Firm* — IPUSA, PLLC

(57) ABSTRACT

A medium processing apparatus includes a liquid applier, a medium processing device, an input device, and circuitry. The liquid applier applies liquid to a medium to perform liquid application. The medium processing device performs a given operation on a bundle of media subjected to the liquid application. The input device inputs a medium characteristic and a liquid characteristic. The circuitry is to employ a pre-trained model trained on correlation relationships, as training data, among the medium characteristic, the liquid characteristic, a liquid application amount, and a physical pressure, to obtain a pre-trained application amount and a pre-trained physical pressure based on the medium characteristic and the liquid characteristic; set the pre-trained application amount and the pre-trained physical pressure; and control the liquid applier and the medium processing device to perform the liquid application and the given operation according to the pre-trained application amount and the pre-trained physical pressure.

5 Claims, 17 Drawing Sheets

(56) References Cited

FOREIGN PATENT DOCUMENTS

| | | | |
|---|---|---|---|
| JP | 2019-010810 | A | 1/2019 |
| JP | 2023-109582 | A | 8/2023 |
| JP | 2023-113561 | A | 8/2023 |

* cited by examiner

MEDIUM PROCESSING APPARATUS AND IMAGE FORMING SYSTEM INCORPORATING SAME

CROSS-REFERENCE TO RELATED APPLICATION

This patent application is based on and claims priority pursuant to 35 U.S.C. § 119(a) to Japanese Patent Application No. 2024-043939, filed on Mar. 19, 2024, in the Japan Patent Office, the entire disclosure of which is hereby incorporated by reference herein.

BACKGROUND

Technical Field

Embodiments of the present disclosure relate to a medium processing apparatus and an image forming system incorporating the medium processing apparatus.

Background Art

Medium processing apparatuses are known in the art that perform binding on a sheet binding operation, which is a bundle of sheet-shaped media stacked on one another are formed. Image forming systems are also known in the art that include an image forming apparatus that forms an image on a sheet-shaped medium, and a medium processing apparatus that is coupled to the image forming apparatus and performs the above-described sheet binding operation.

Sheet-shaped media may be various types of materials. In the present specification, as an example of the sheet-shaped medium, "sheet" is assumed as a medium that is generally widely used for image formation. Further, in the following description, "sheet bundle" that is a stack of multiple media or sheets is assumed as a bundle of sheet-shaped media.

A medium processing apparatus in the art performs a sheet binding operation in which a part of a bundle of media is pressed and bound. In the medium processing apparatus in the art, different pressure forces are applied depending on whether liquid application is performed on a medium when performing the sheet binding operation in which the bundle of media is pressed and then bound.

SUMMARY

Embodiments of the present disclosure described herein provide a novel medium processing apparatus including a liquid applier, a medium processing device, an input device, and circuitry. The liquid applier applies liquid to a part of a medium to perform a liquid application. The medium processing device performs a given operation on a bundle of media including the medium subjected to the liquid application. The input device inputs at least a medium characteristic that individually specifies types of media including the medium and a liquid characteristic that specifies a liquid used in the liquid application. The circuitry is to employ a pre-trained model trained on correlation relationships, as training data, among the medium characteristic, the liquid characteristic, a liquid application amount applied to the medium by the liquid application, and a physical pressure applied to the medium in the given operation, to obtain a pre-trained application amount and a pre-trained physical pressure based on the medium characteristic and the liquid characteristic; set the pre-trained application amount and the pre-trained physical pressure obtained by the pre-trained model; and control the liquid applier and the medium processing device to perform the liquid application and the given operation according to the pre-trained application amount and the pre-trained physical pressure.

Further, embodiments of the present disclosure described herein provide an image forming system including an image former, a liquid applier, a medium processing device, an input device, and circuitry. The image former forms an image on a medium. The liquid applier applies liquid to a part of the medium on which the image is formed by the image former. The medium processing device performs a given operation on a bundle of media including the medium subjected to liquid application by the liquid applier. The input device inputs at least a medium characteristic that individually specifies types of media including the medium, and a liquid characteristic that specifies a liquid used in the liquid application. The circuitry is to employ a pre-trained model trained on correlation relationships, as training data, among the medium characteristic, the liquid characteristic, a liquid application amount applied to the medium by the liquid application, and a physical pressure applied to the medium in the given operation, to obtain a pre-trained application amount and a pre-trained physical pressure based on the medium characteristic and the liquid characteristic; set the pre-trained application amount and the pre-trained physical pressure obtained by the pre-trained model; and control the liquid applier and the medium processing device to perform the liquid application and the given operation according to the pre-trained application amount and the pre-trained physical pressure.

BRIEF DESCRIPTION OF THE SEVERAL VIEWS OF THE DRAWINGS

Exemplary embodiments of this disclosure will be described in detail based on the following figures, wherein.

Figure 1:
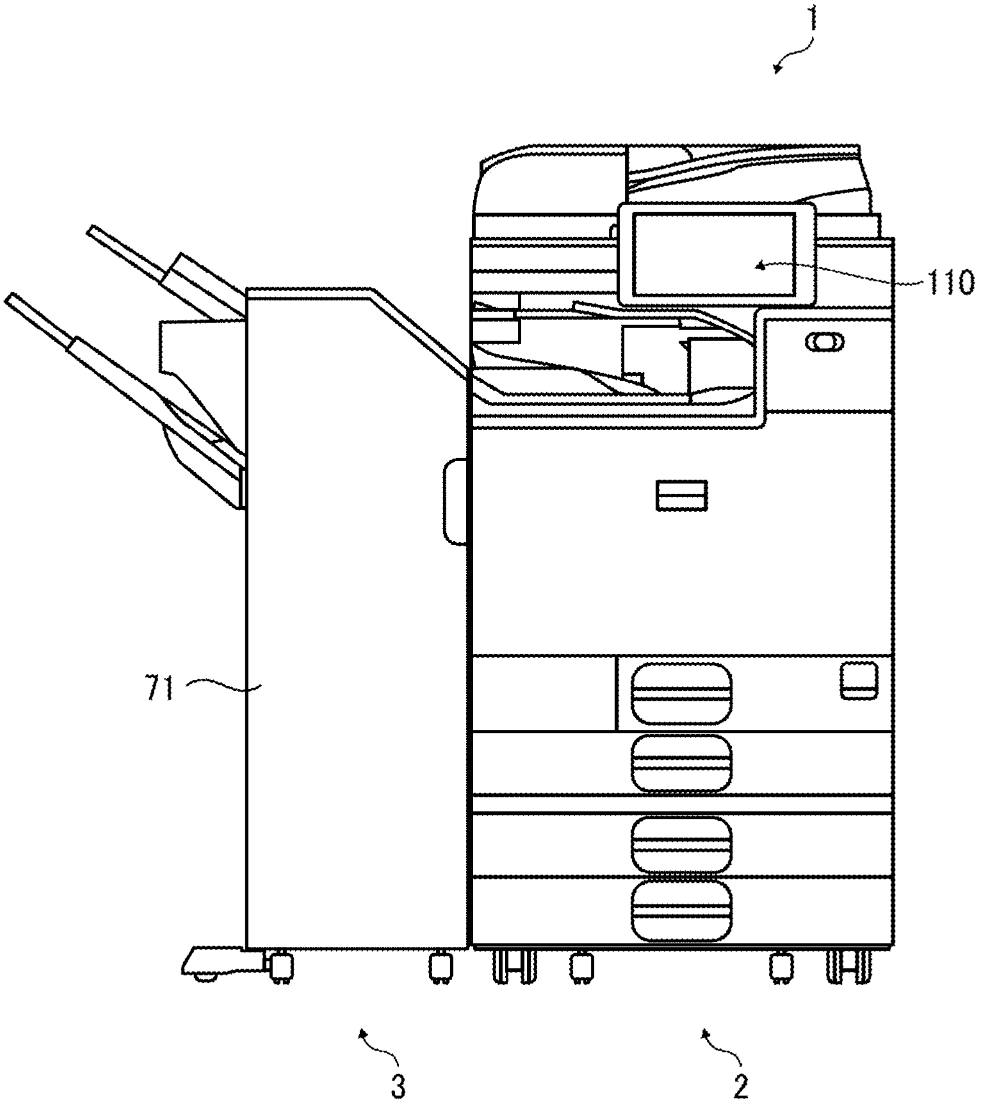
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described below in detail with reference to the drawings. Identical reference numerals are assigned to identical or equivalent components and a description of those components may be simplified or omitted.

Embodiments of the present disclosure is described below with reference to the drawings.

FIG. 1 is a diagram illustrating an overall configuration of the image forming system 1 according to the present embodiment.

The image forming system 1 has a function of forming an image on a sheet P as a sheet-shaped medium and a function of performing given operations including a sheet binding operation on the sheet P on which on which an image is formed. As illustrated in FIG. 1, the image forming system 1 includes an image forming apparatus 2, and a post-processing apparatus 3 as an embodiment of a medium processing apparatus according to the present disclosure.

The image forming apparatus 2 forms an image on the sheet P and ejects the sheet P on which an image bearing the image to the post-processing apparatus 3. The image forming apparatus 2 includes a tray that accommodates the sheet P, a conveyor that conveys the sheet P accommodated in the tray, and an image forming device that forms an image on the sheet P conveyed by the conveyor.

The image forming device may be an inkjet image forming device that forms an image with ink or an electrophotographic image forming device that forms an image with toner.

Since the image forming apparatus 2 has a typical configuration, a detailed description of the configuration and functions of the image forming apparatus 2 are omitted.

Figure 2:
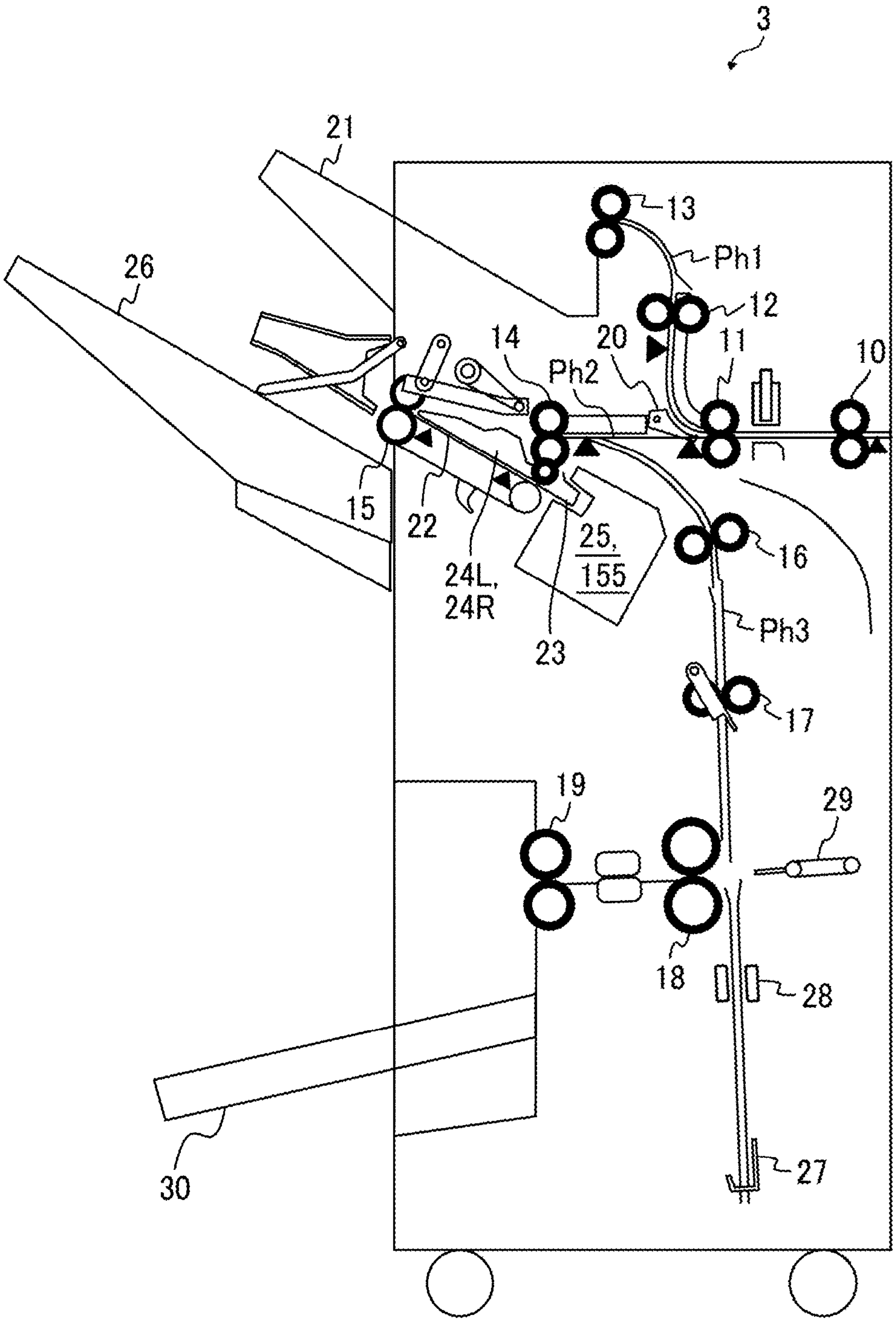
FIG. 2 is a diagram illustrating an internal configuration of a post-processing apparatus included in the image forming system of FIG. 1.

FIG. 2 is a diagram illustrating an internal configuration of the post-processing apparatus 3 serving as a medium processing apparatus according to the first embodiment of the present disclosure.

The post-processing apparatus 3 performs a post-processing operation on the sheet P on which the image is formed by the image forming apparatus 2.

An example of the post-processing operation according to the present embodiment is binding or a sheet binding operation as a "crimp binding operation" to bind, without staples, a plurality of sheets P on each of which an image is formed as a bundle of sheets P (bundle of media), which may be referred to as a sheet bundle.

Another example of the post-processing operation according to the present embodiment is binding or a sheet binding operation as a "stapling operation" to bind, with staples, multiple sheets P on each of which an image is formed as a bundle of sheets P (i.e., sheet bundle).

In the following description, the bundle of sheets P as a bundle of recording media may be referred to as a "sheet bundle Pb." More specifically, the "crimp binding operation" according to the present embodiment is a process called "crimp binding" to apply pressure to the binding position corresponding to a part of the sheet bundle Pb to deform (perform pressure deformation on) the binding position and bind the sheet bundle Pb.

The sheet binding operation that can be executed by the post-processing apparatus 3 includes edge binding and saddle binding. The edge binding is a process to bind an end (including an edge) of the sheet bundle Pb. The saddle binding is a process to bind the center of the sheet bundle Pb.

The post-processing apparatus 3 includes the conveyance roller pairs 10 to 19 (conveyors) and the switcher 20. The conveyance roller pairs 10 to 19 convey, inside the post-processing apparatus 3, the sheet P supplied from the image forming apparatus 2.

More specifically, the conveyance roller pairs 10 to 13 convey the sheet P along a first conveyance path Ph1.

The conveyance roller pairs 14 and 15 convey the sheet P along a second conveyance path Ph2.

The conveyance roller pairs 16 to 19 convey the sheet P along a third conveyance path Ph3.

The first conveyance path Ph1 is a path extending to a first ejection tray 21 from a sheet supplying port through which the sheet P is supplied from the image forming apparatus 2.

The second conveyance path Ph2 is a path branching from the first conveyance path Ph1 between the conveyance roller pairs 11 and 14 in a conveyance direction and extending to a second ejection tray 26 via an internal tray 22 as a receptacle.

The third conveyance path Ph3 is a path branching from the first conveyance path Ph1 between the conveyance roller pairs 11 and 14 in the conveyance direction and extending to a third ejection tray 30.

The switcher 20 is disposed at a branching position of the first conveyance path Ph1 and the second conveyance path Ph2. The switcher 20 can be switched between a first position and a second position. The switcher 20 in the first position guides the sheet P to be ejected to the first ejection tray 21 through the first conveyance path Ph1. The switcher 20 in the second position guides the sheet P conveyed through the first conveyance path Ph1 to the second conveyance path Ph2. When a trailing end of the sheet P entering the second conveyance path Ph2 passes through the conveyance roller pair 11, the conveyance roller pair 14 is rotated in reverse to guide the sheet P to the third conveyance path Ph3.

The post-processing apparatus 3 further includes multiple sensors that detect the positions of the sheet P in the first conveyance path Ph1, the second conveyance path Ph2, and the third conveyance path Ph3. Each of the multiple sensors is indicated by a black triangle mark in FIG. 2.

The post-processing apparatus 3 includes the first ejection tray 21. The sheet P ejected through the first conveyance path Ph1 is placed on the first ejection tray 21. Among the sheets P supplied from the image forming apparatus 2, the sheets P that are not bound are ejected to the first ejection tray 21.

The post-processing apparatus 3 further includes the internal tray 22 as a receptacle, an end fence 23, side fences 24L and 24R, an edge binder 25, a staple binder 155, and the second ejection tray 26.

The internal tray 22, the end fence 23, the side fences 24L and 24R, the edge binder 25, and the staple binder 155 perform the edge binding on the sheet bundle Pb of multiple sheets P conveyed through the second conveyance path Ph2. Among the sheets P supplied from the image forming apparatus 2, the sheet bundle Pb subjected to the edge binding is ejected to the second ejection tray 26.

The "edge binding" includes "parallel binding operation," "oblique binding operation," and "vertical binding operation." The "parallel binding operation" is a process of binding the sheet bundle Pb along one side of the sheet bundle Pb parallel to the main scanning direction. The "oblique binding operation" is a process of binding a corner of the sheet bundle Pb. The "vertical binding operation" is a process of binding the sheet bundle Pb along one side of the sheet bundle Pb parallel to the conveyance direction.

In the following description, a direction in which the sheet P is conveyed from the conveyance roller pair 15 toward the end fence 23 is defined as a "conveyance direction" of the sheet P. In other words, the "conveyance direction" corresponds to a direction in which the sheet P that has been ejected from the image forming apparatus 2 is moved toward the end fence 23 by the conveyance roller pair 15 after being moved toward the second ejection tray 26 by, for example, the conveyance roller pair 10. A direction that is orthogonal to the conveyance direction and a thickness direction of the sheet P is defined as a "main scanning direction" or a "width direction of the sheet P."

The sheets P that are sequentially conveyed through the second conveyance path Ph2 are temporarily placed on the internal tray 22 as a placement tray.

The end fence 23 aligns the position, in the conveyance direction, of the sheet P or the sheet bundle Pb placed on the internal tray 22.

The side fences 24L and 24R align the position, in the main scanning direction, of the sheet P or the sheet bundle Pb placed on the internal tray 22.

The edge binder 25 and the staple binder 155 bind an end of the sheet bundle Pb aligned by the end fence 23 and the side fences 24L and 24R. Then, the conveyance roller pair 15 ejects the sheet bundle Pb subjected to the edge binding to the second ejection tray 26.

The post-processing apparatus 3 further includes an end fence 27, a saddle binder 28, a sheet folding blade 29, and the third ejection tray 30.

The end fence 27, the saddle binder 28, and the sheet folding blade 29 perform the saddle binding on the sheet bundle Pb including the sheets P that are conveyed through the third conveyance path Ph3. Among the sheets P supplied from the image forming apparatus 2, the sheet bundle Pb subjected to the saddle binding is ejected to the third ejection tray 30.

The end fence 27 aligns the positions of the sheets P that are sequentially conveyed through the third conveyance path Ph3, in a conveyance direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29.

The saddle binder 28 binds the center of the sheet bundle Pb aligned by the end fence 27 at the binding position.

The sheet folding blade 29 folds, in half, the sheet bundle Pb placed on the end fence 27 at the folding position and causes the conveyance roller pair 18 to nip the sheet bundle Pb.

The conveyance roller pairs 18 and 19 eject the sheet bundle Pb subjected to the saddle binding to the third ejection tray 30.

The post-processing apparatus 3 includes, in the edge binder 25, a first liquid storage tank 43 as a first liquid storage and a first liquid supplier 45 as a part of a liquid applier 31.

Figure 4:
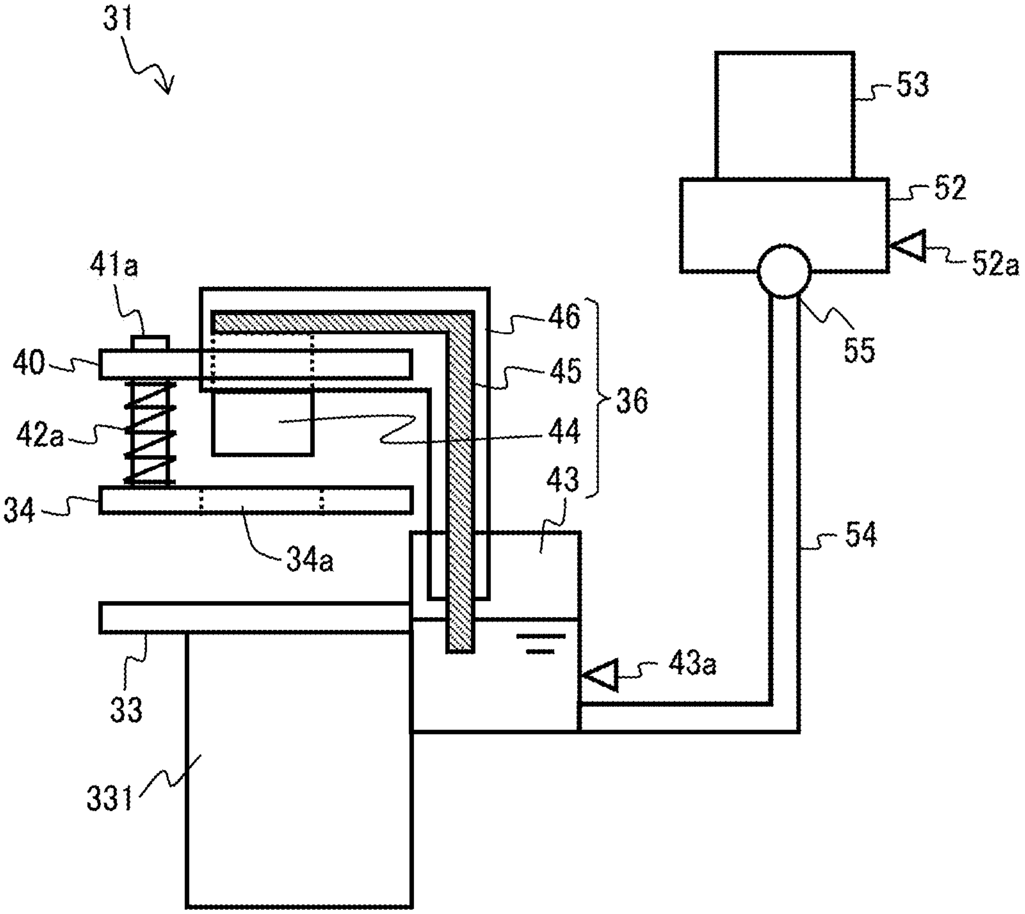
FIG. 4 is a schematic diagram illustrating the edge binder of FIG. 3 as viewed from the side on which a liquid applier is disposed in a main scanning direction.

The first liquid storage tank 43 and the first liquid supplier 45 are illustrated in FIG. 4.

The post-processing apparatus 3 further includes a second liquid supplier 54 as a part of a liquid supplier, a liquid supply pump 55 as a part of the liquid supplier, a second liquid storage tank 53 as a part of a second liquid storage, and a second liquid storage tank fixer 52 as a part of the second liquid storage, to replenish the first liquid storage tank 43 with liquid.

The liquid that is stored in the second liquid storage tank 53 is supplied to the first liquid storage tank 43 via the second liquid storage tank fixer 52, the liquid supply pump 55, and the second liquid supplier 54.

Figure 3:
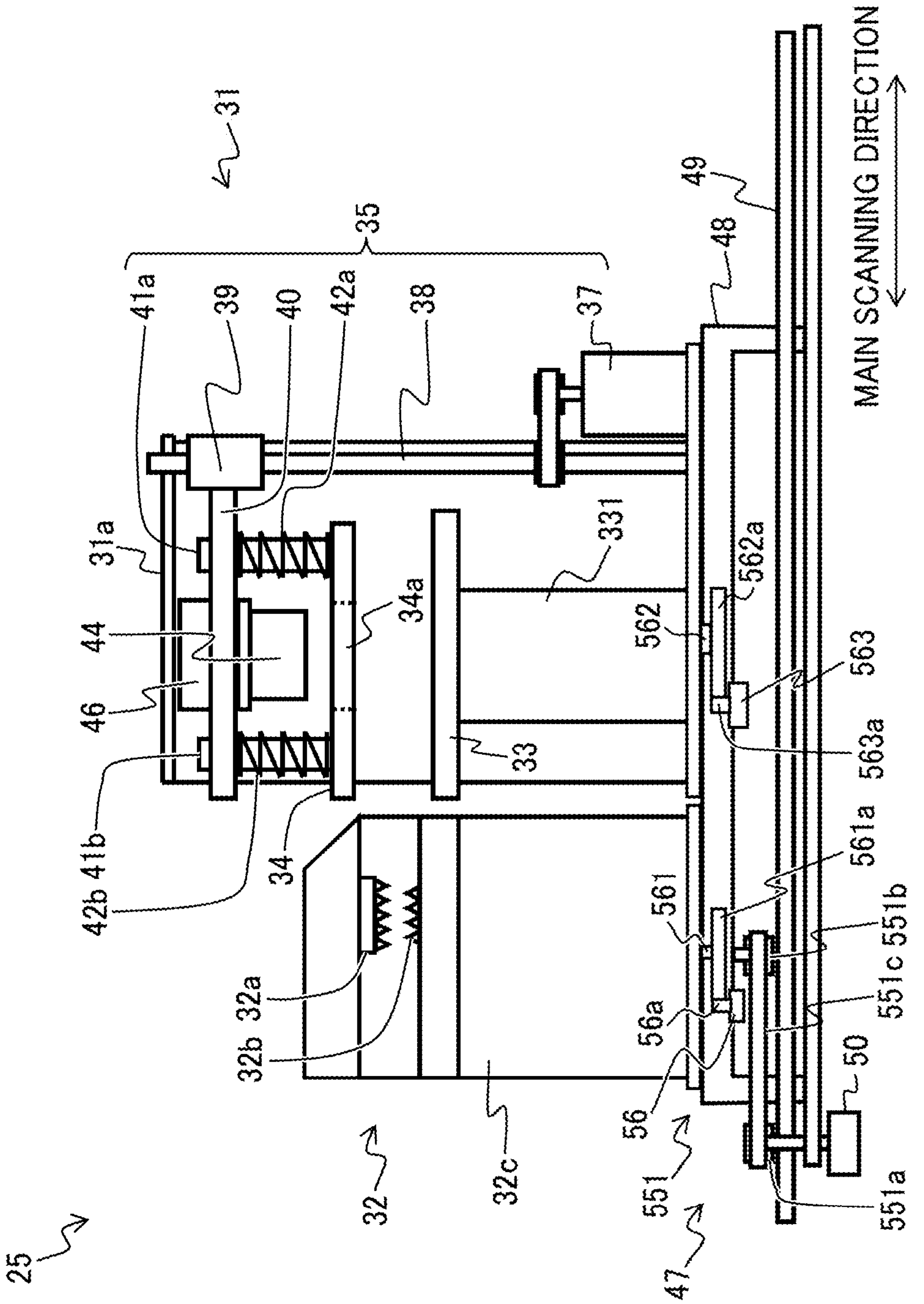
FIG. 3 is a schematic diagram illustrating an edge binder according to an embodiment of the present disclosure, viewed from an upstream side in a conveyance direction.

FIG. 3 is a schematic view of an upstream side of the edge binder 25 in the conveyance direction of the sheet P.

The edge binder 25 performs liquid application and crimp binding.

FIG. 4 is a schematic diagram illustrating a liquid applier 31 of the edge binder 25 when viewed from the main scanning direction.

As illustrated in FIG. 3, the edge binder 25 includes the liquid applier 31 and a crimper 32. The liquid applier 31 executes a processing operation related to the liquid application. The crimper 32 functions as a post-processing device and executes the crimp binding. The liquid applier 31 and the crimper 32 are disposed downstream from the internal tray 22 in the conveyance direction and adjacent to each other in the main scanning direction.

The liquid applier 31 applies the liquid that is stored in the first liquid storage tank 43 to the sheet P or the sheet bundle Pb placed on the internal tray 22. In the following description, the application of liquid to the sheet P or the sheet bundle Pb may be referred to as "liquid application" whereas a process to apply liquid may be referred to as a "liquid application operation."

More specifically, the liquid that is stored in the first liquid storage tank 43 for the "liquid application" includes, as a main component, a liquid hydrogen-oxygen compound represented by the chemical formula H2O. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in the first liquid storage tank 43 may include an additive in addition to the main component. The liquid that is stored in the first liquid storage tank 43 may include residual chlorine used as tap water. Preferably, for example, the liquid that is stored in the first liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply to enhance the binding strength after the binding process because tap water is easy to obtain and store. A liquid including water as a main component as exemplified above can enhance the binding strength of the sheet bundle Pb, in comparison with a liquid of which the main component is not water (liquid).

The liquid applier 31 and the crimper 32 can be moved together in the main scanning direction by a driving force transmitted from an edge binder movement motor 50. A liquid application position or a liquid application region to which the liquid is applied on the sheet P or the sheet bundle Pb by the liquid applier 31 corresponds to a crimp binding position or a crimp binding region on the sheet bundle Pb to be crimped and bound by the crimper 32. For this reason, in the following description, the liquid application position (or the liquid application region) and the crimp binding position (or the crimp binding region) are denoted by the same reference numeral.

The liquid applier 31 as a liquid applier includes a lower pressure plate 33 as a receptacle for the sheet P or the sheet bundle Pb, an upper pressure plate 34, a liquid applier movement assembly 35, and a liquid application assembly 36.

The components of the liquid applier 31 such as the lower pressure plate 33, the upper pressure plate 34, the liquid applier movement assembly 35, and the liquid application assembly 36 are held by a liquid application frame **31*a* and a base 48**.

The lower pressure plate 33 and the upper pressure plate 34 are disposed downstream from the internal tray 22 in the conveyance direction. The sheets P or the sheet bundle Pb that is placed on the internal tray 22 is also placed on the lower pressure plate 33. The lower pressure plate 33 is disposed on a lower pressure plate holder 331.

The upper pressure plate 34 is movable in the thickness direction of the sheet P or the sheet bundle Pb at a position where the upper pressure plate 34 faces the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction."

The upper pressure plate 34 has a through hole **34*a* penetrating in the thickness direction at a position where the through hole 34*a* faces an end of a liquid application member 44, which is a part of the liquid applier 31, held via a holder 46 attached to a base plate 40**.

The liquid applier movement assembly 35 moves the upper pressure plate 34, the base plate 40, the holder 46, the liquid application member 44, the first liquid supplier 45, and the first liquid storage tank 43 in the thickness direction of the sheet P or the sheet bundle Pb. The liquid applier movement assembly 35 according to the present embodiment moves the upper pressure plate 34, the base plate 40, the first liquid storage tank 43, the liquid application member 44, the first liquid supplier 45, and the holder 46 in conjunction with each other (in a unified way) by a single liquid applier movement motor 37. The liquid applier movement assembly 35 includes, for example, the liquid applier movement motor 37, a trapezoidal screw 38, a nut 39, the base plate 40, columns **41*a* and 41*b*, and coil springs 42*a* and 42*b***.

The liquid applier movement motor 37 generates a driving force to move the upper pressure plate 34, the base plate 40, the holder 46, the liquid application member 44, the first liquid supplier 45, and the first liquid storage tank 43.

The trapezoidal screw 38 extends in the thickness direction of the sheet P or the sheet bundle Pb and is supported by the liquid application frame **31*a* of the liquid applier 31 so as to be rotatable in the forward and reverse directions. The trapezoidal screw 38 is coupled to an output shaft of the liquid applier movement motor 37** via, for example, a pulley and a belt.

The nut 39 is screwed to the trapezoidal screw 38.

The trapezoidal screw 38 is rotated in the forward and reverse directions by the driving force transmitted from the liquid applier movement motor 37. The rotation of the trapezoidal screw 38 causes the nut 39 to reciprocate on the trapezoidal screw 38.

The base plate 40 is positioned apart from the upper pressure plate 34. The base plate 40 holds the liquid application member 44 with the end of the liquid application member 44 projecting from the base plate 40 toward the upper pressure plate 34. The base plate 40 is coupled to the trapezoidal screw 38 via the nut 39 so as to reciprocate along the trapezoidal screw 38 when the trapezoidal screw 38 rotates in the forward and reverse directions. The position of the base plate 40 in the thickness direction of the sheet P or the sheet bundle Pb is detected by a position detection sensor 40*a*.

The columns 41*a* and 41*b* project from the base plate 40 toward the upper pressure plate 34 around the end of the liquid application member 44. The columns 41*a* and 41*b* are movable relative to the base plate 40 in the thickness direction. The columns 41*a* and 41*b* hold the upper pressure plate 34 with the respective ends closer to the lower pressure plate 33 than the other ends of the columns 41*a* and 41*b*. The other ends of the columns 41*a* and 41*b* opposite the ends closer to the lower pressure plate 33 are provided with stoppers that prevent the columns 41*a* and 41*b* from being removed from the base plate 40.

The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* toward the lower pressure plate 33 with respect to the base plate 40.

The liquid application assembly 36 applies liquid to the sheet P or the sheet bundle Pb placed on the internal tray 22. Specifically, the liquid applier 31 brings the liquid application member 44 into contact with the sheet P or the sheet bundle Pb to apply the liquid to at least one sheet P of the sheet bundle Pb.

The liquid application assembly 36 includes a first liquid amount detection sensor 43*a* as a first liquid detector, the first liquid storage tank 43, the liquid application member 44, the first liquid supplier 45, and the holder 46.

The first liquid storage tank 43 stores the liquid to be applied to the sheet P or the sheet bundle Pb. The amount of liquid that is stored in the first liquid storage tank 43 is detected by the first liquid amount detection sensor 43*a*. The first liquid storage tank 43 is coupled to the base plate 40 via the holder 46.

The liquid application member 44 applies the liquid stored in the first liquid storage tank 43 to the sheet P or the sheet bundle Pb. The liquid application member 44 and the first liquid supplier 45 disposed in close contact with the liquid application member 44 are both held by the holder 46.

The holder 46 is held by the base plate 40. The holder 46 is an elongated cylindrical body (for example, a tube) that is fitted around the first liquid supplier 45. The holder 46 prevents the liquid absorbed by the first liquid supplier 45 from leaking or evaporating.

The first liquid supplier 45 has a first end in close contact with the liquid application member 44 and a second end immersed in the liquid stored in the first liquid storage tank 43. In other words, the second end of the first liquid supplier 45 corresponds to an immersion portion that sucks up the liquid and supplies the liquid to the liquid application member 44.

Each of the liquid application member 44 and the first liquid supplier 45 is made of a material having a relatively high liquid absorption such as an elastic resin formed of open cells. For example, the liquid application member 44 and the first liquid supplier 45 may be made of sponge or fiber. Accordingly, when the other second end of the first liquid supplier 45 is immersed in the stored liquid, the liquid is sucked up by capillary action. As a result, the first liquid supplier 45 and the liquid application member 44 are filled with the liquid.

The liquid application member 44 according to the present embodiment has a planar end face. The liquid application member 44 according to the present embodiment is supported by the base plate 40 such that the end face is parallel to the sheet P or the sheet bundle Pb placed on the internal tray 22.

A liquid applier shaft 562 provided with a drive transmission gear 562*a* is fixed to a bottom face of the liquid application frame 31*a* that holds the components of the liquid applier 31. The liquid applier shaft 562 and the drive transmission gear 562*a* are held by the base 48 on which the liquid application frame 31*a* is disposed, so as to be rotatable in the forward and reverse directions. The drive transmission gear 562*a* meshes with an output gear 563*a* of a liquid applier pivot motor 563. The liquid applier 31 can be rotated in the forward and reverse directions about the liquid applier shaft 562 on the base 48 by a driving force transmitted from the liquid applier pivot motor 563 to the liquid applier shaft 562 via the output gear 563*a* and the drive transmission gear 562*a*.

As illustrated in FIG. 4, the post-processing apparatus 3 includes the second liquid storage tank fixer 52 as a part of the second liquid storage, the second liquid storage tank 53 as a part of a second liquid storage, the second liquid supplier 54, and the liquid supply pump 55, to supply liquid to the first liquid storage tank 43. For example, the liquid is supplied to the first liquid storage tank 43 in a way described below. However, the way of supplying the liquid to the first liquid storage tank 43 is not limited to the following example. Alternatively, for example, a user may directly replenish the first liquid storage tank 43 with the liquid.

Figure 5A:
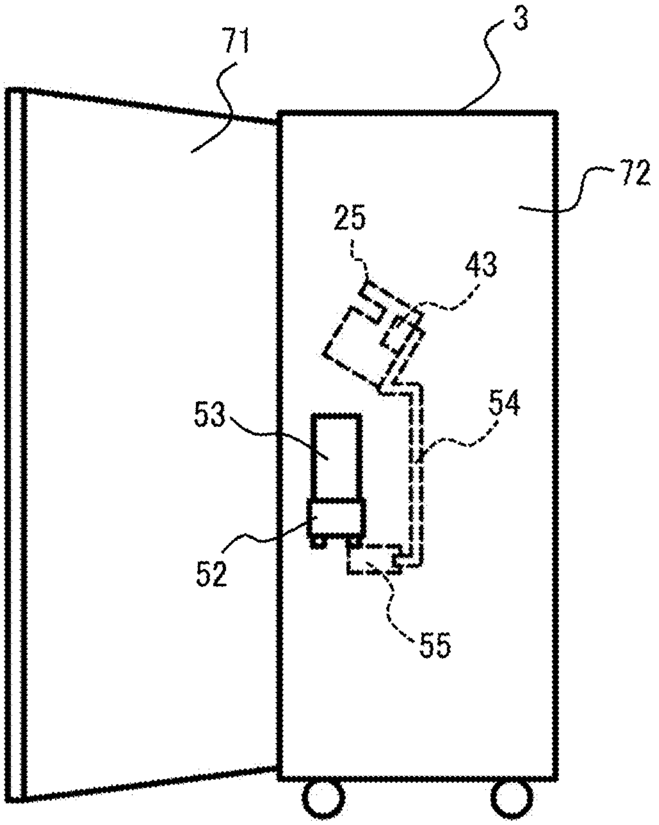
FIGS. 5A and 5B are diagrams each illustrating the location and configuration of a second liquid storage tank in a post-processing apparatus.
Figure 5B:
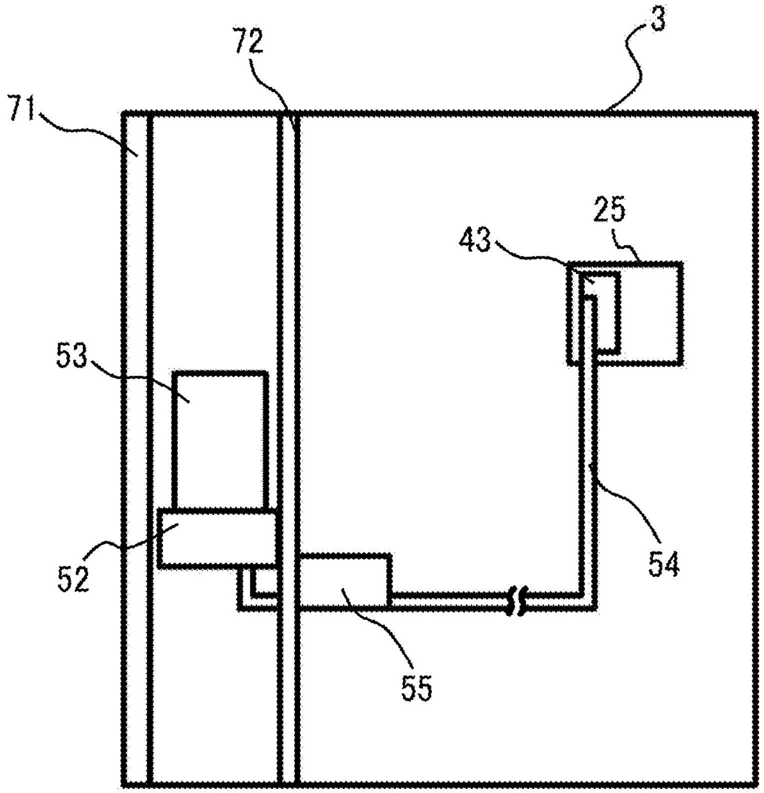
Figure 6:
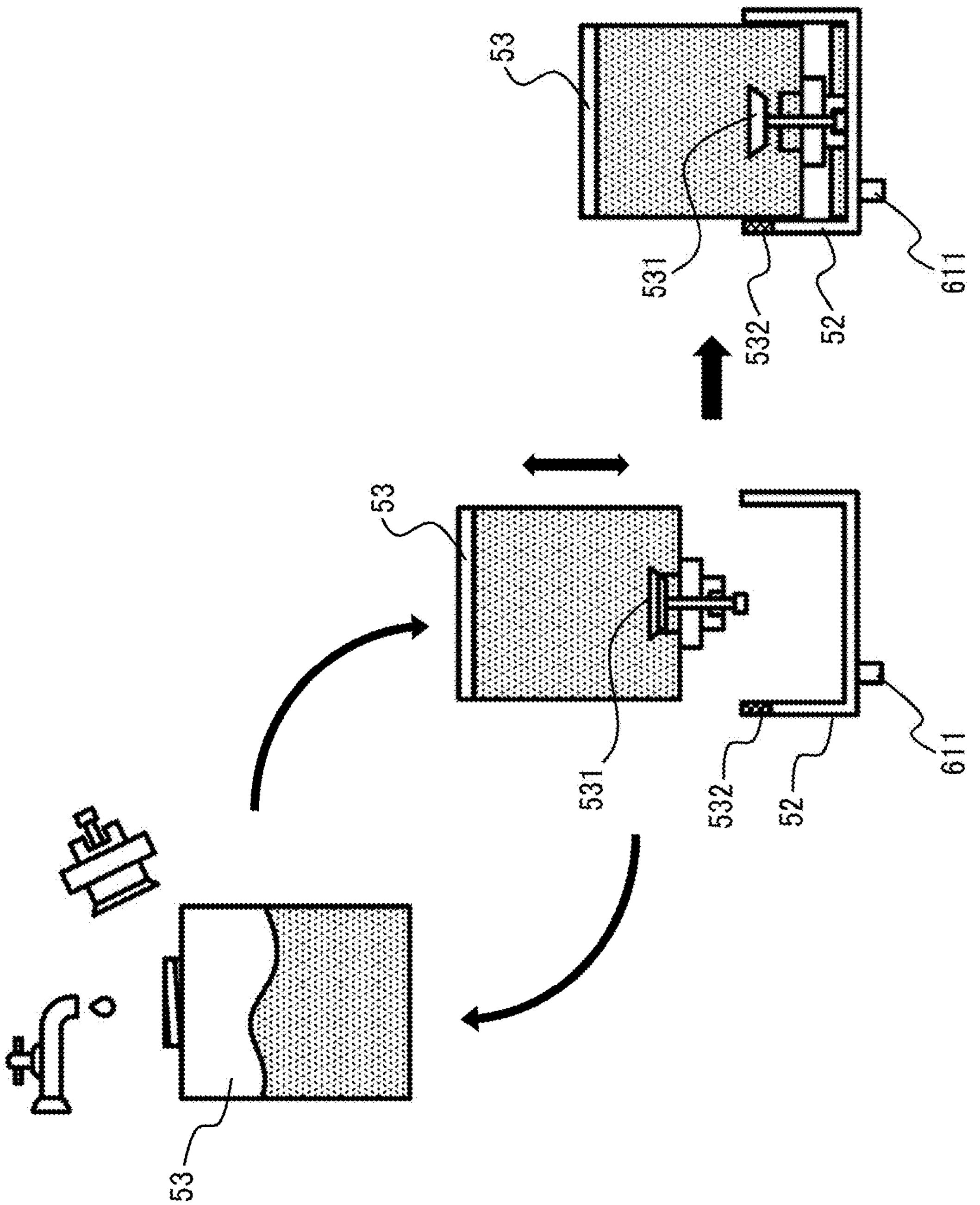
FIG. 6 is a diagram illustrating a configuration of attachment and detachment of a second liquid storage tank of a post-processing apparatus.

Referring now to FIGS. 5A to 6, a description is given of the location and configuration of the second liquid storage tank 53.

FIGS. 5A and 5B illustrate example location and configuration of the second liquid storage tank 53 as the main tank.

Specifically, FIG. 5A illustrates the post-processing apparatus 3 with a cover (i.e., a front door 71) opened.

FIG. 5B is a cross-sectional side view of the post-processing apparatus 3. FIG. 5B illustrates the post-processing apparatus 3 with the cover (i.e., the front door 71) closed.

As illustrated in FIGS. 5A and 5B, the second liquid storage tank 53 is located so as to be accessible when the front door 71 of the post-processing apparatus 3 is opened. A main body side plate 72 of the post-processing apparatus 3 is disposed between where the second liquid storage tank 53 and the second liquid storage tank fixer 52 are disposed and where the first liquid storage tank 43 is disposed.

The second liquid storage tank fixer 52 is provided with a liquid drain plug 611. After the liquid remaining in the first liquid storage tank 43 and the second liquid supplier 54 is reversely fed to the second liquid storage tank fixer 52, the liquid drain plug 611 is opened to discharge the liquid stored in the second liquid storage tank fixer 52 from the inside of the post-processing apparatus 3. Thus, the liquid is prevented from being frozen during maintenance of the post-processing apparatus 3.

FIG. 6 illustrates the second liquid storage tank 53 attachable to and detachable from the second liquid storage tank fixer 52 and replenished with liquid.

As illustrated in FIG. 5, the second liquid storage tank 53 is attachable to and detachable from the second liquid storage tank fixer 52 so as to be replenished with liquid. The second liquid storage tank fixer 52 is provided with a setting detection sensor 532 that detects that the second liquid storage tank 53 is set in the second liquid storage tank fixer 52.

When the second liquid storage tank 53 is not set in the second liquid storage tank fixer 52, an outlet of the second liquid storage tank 53 is closed by a liquid supply valve 531 so that the liquid does not leak. When the second liquid storage tank 53 is set in the second liquid storage tank fixer 52, the liquid supply valve 531 is pushed up and the liquid stored in the second liquid storage tank 53 flows to the second liquid storage tank fixer 52, allowing the liquid to be stored in the second liquid storage tank fixer 52.

The second liquid storage tank fixer 52 stores the liquid to be supplied to the first liquid storage tank 43. The second liquid storage tank fixer 52 is attached to the main body side plate 72 of the post-processing apparatus 3 outside the moving range, in the main scanning direction, of the edge binder 25 including the liquid applier 31. The amount of liquid that is stored in the second liquid storage tank fixer 52 is detected by a second liquid amount detection sensor 52*a* as a second liquid detector.

The second liquid storage tank 53, which is a liquid bottle, stores the liquid to be supplied to the second liquid storage tank fixer 52. The second liquid storage tank 53 is attachable to and detachable from the second liquid storage tank fixer 52.

When the second liquid storage tank 53 is attached to the second liquid storage tank fixer 52, the liquid moves from the second liquid storage tank 53 to the second liquid storage tank fixer 52 until the amount of liquid in the second liquid storage tank fixer 52 reaches a second upper limit value. When the amount of liquid in the second liquid storage tank fixer 52 reaches the second upper limit value, the liquid stops moving from the second liquid storage tank 53 to the second liquid storage tank fixer 52.

The second liquid supplier 54 couples the second liquid storage tank fixer 52 and the first liquid storage tank 43 to each other. The second liquid supplier 54 supplies the liquid stored in the second liquid storage tank fixer 52 to the first liquid storage tank 43. The second liquid supplier 54 is, for example, a pipe, a hose, or a combination thereof. The diameter (inner diameter) of the second liquid supplier 54 is set to such a size that allows the speed at which the liquid is supplied from the second liquid storage tank fixer 52 to the first liquid storage tank 43 through the second liquid supplier 54 to be higher than the speed at which the liquid is supplied from the first liquid storage tank 43 to the liquid application member 44 through the first liquid supplier 45. In the following description, the speed at which the liquid is supplied from the first liquid storage tank 43 to the liquid application member 44 through the first liquid supplier 45 may be referred to as a first supply speed whereas the speed at which the liquid is supplied from the second liquid storage tank fixer 52 to the first liquid storage tank 43 through the second liquid supplier 54 may be referred to as a second supply speed.

The liquid supply pump 55 is attached to the main body side plate 72 of the post-processing apparatus 3 together with the second liquid storage tank fixer 52. The liquid supply pump 55 supplies (pumps) the liquid stored in the second liquid storage tank fixer 52 to the first liquid storage tank 43 through the second liquid supplier 54.

As illustrated in FIG. 3, the crimper 32 as a post-processing device sandwiches, with serrate upper crimping teeth 32*a* and serrate lower crimping teeth 32*b*, at least a part (in other words, the liquid application position) of the sheet bundle Pb to which the liquid is applied by the liquid applier 31, to press and deform at least the part of the sheet bundle Pb. Thus, the crimper 32 binds the sheet bundle Pb.

In the following description, such a binding way in which the upper crimping teeth 32*a* and the lower crimping teeth 32*b* sandwich and press the sheet bundle Pb to deform at least a part of the sheet bundle Pb may be referred to as "crimp binding." In other words, the crimper 32 crimps and binds the sheet bundle Pb or performs the crimp binding on the sheet bundle Pb. In short, the crimper 32 binds the sheet bundle Pb without binding materials such as staples. The components of the crimper 32 such as the upper crimping teeth 32*a* and the lower crimping teeth 32*b* are disposed on a crimping frame 32*c*.

Figure 7A:
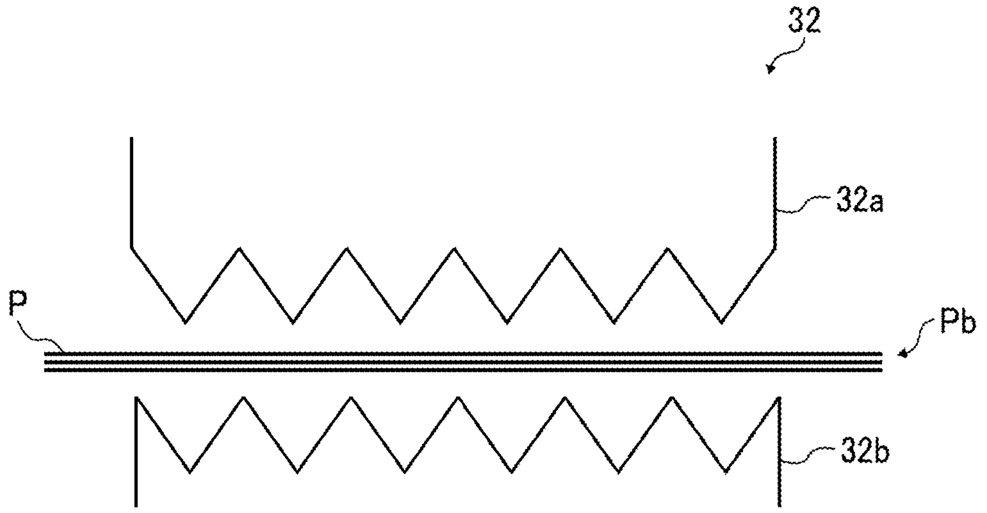
FIGS. 7A and 7B are diagrams each illustrating a schematic configuration of a crimper of an edge binder.
Figure 7B:

FIGS. 7A and 7B are schematic diagrams illustrating the configuration of the crimper 32.

As illustrated in FIGS. 7A and 7B, the crimper 32 includes a pair of binding teeth (i.e., the upper crimping teeth 32*a* and the lower crimping teeth 32*b*). The upper crimping teeth 32*a* and the lower crimping teeth 32*b* are disposed to face each other in the thickness direction of the sheet bundle Pb to pinch the sheet bundle Pb placed on the internal tray 22.

The upper crimping teeth 32*a* and the lower crimping teeth 32*b* have respective serrate faces facing each other. The serrate face of each of the upper crimping teeth 32*a* and the lower crimping teeth 32*b* includes concave portions and convex portions alternately formed. The concave portions and the convex portions of the upper crimping teeth 32*a* are shifted from those of the lower crimping teeth 32*b* such that the upper crimping teeth 32*a* are engaged with the lower crimping teeth 32*b*. The upper crimping teeth 32*a* and the lower crimping teeth 32*b* are brought into contact with and separated from each other by the driving force of a contact-separation motor 32*d* illustrated in FIG. 8.

In the process of supplying the sheets P of the sheet bundle Pb to the internal tray 22, the upper crimping teeth 32*a* and the lower crimping teeth 32*b* are apart from each other as illustrated in FIG. 7A.

When all the sheets P of the sheet bundle Pb are placed on the internal tray 22, the upper crimping teeth 32*a* and the lower crimping teeth 32*b* are engaged with each other to press and deform the sheet bundle Pb in the thickness direction as illustrated in FIG. 7B. As a result, the sheet bundle Pb that has been placed on the internal tray 22 is crimped and bound. The sheet bundle Pb thus crimped and bound is ejected to the second ejection tray 26 by the conveyance roller pair 15.

The configuration of the crimper 32 is not limited to the configuration of a movement assembly exemplified in the present embodiment, and may be any other suitable structure in which the upper crimping teeth 32*a* and the lower crimping teeth 32*b* of the crimping assembly engage with each other. For example, the crimping assembly may be a crimping assembly of a ling mechanism system that performs the crimping and separating operations of the upper crimping teeth 32*a* and the lower crimping teeth 32*b* with a driving source that rotates in the forward direction only or that rotates in the forward and backward directions and a link mechanism (e.g., the crimping assembly disclosed in Japanese Patent No. 6057167), or a crimping assembly of a linear motion system that linearly performs the crimping and separating operations of the upper crimping teeth 32*a* and the lower crimping teeth 32*b* with a screw assembly that converts the forward and backward rotational motions of a driving source into linear reciprocating motion.

A crimper rotary shaft 561 provided with a drive transmission gear 54*a* is fixed to a bottom face of the crimping frame 32*c* that holds the components of the crimper 32. The crimper rotary shaft 561 and the drive transmission gear 54*a* are held by a base 48 on which the crimping frame 32*c* is disposed, so as to be rotatable in the forward and reverse directions. The drive transmission gear 54*a* meshes with an output gear 56*a* of a crimper pivot motor 56. The crimper 32 can be rotated in the forward and reverse directions about the crimper rotary shaft 561 on the base 48 by a driving force transmitted from the crimper pivot motor 56 to the crimper rotary shaft 561 via the output gear 56*a* and the drive transmission gear 54*a*.

Control Configuration

Figure 8:
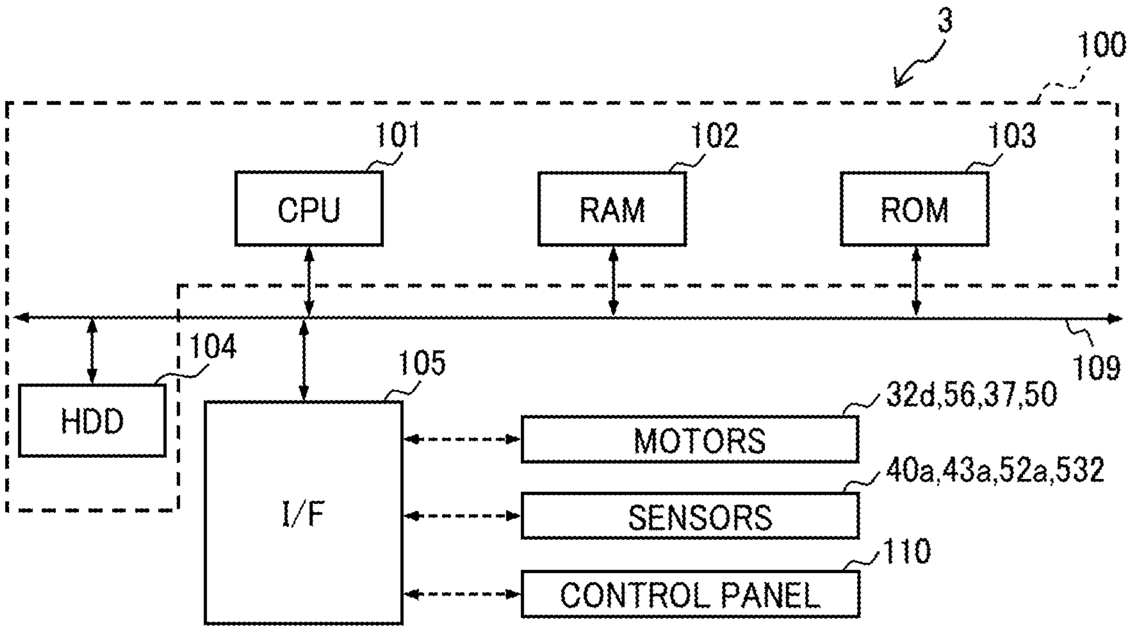
FIG. 8 is a block diagram illustrating a hardware configuration of a control block to control the post-processing apparatus.

FIG. 8 is a block diagram illustrating a hardware configuration of a control block of the post-processing apparatus 3 to control operations of the post-processing apparatus 3.

As illustrated in FIG. 8, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3.

The RAM 102 is a volatile storage medium that allows data to be read and written at high speed. The CPU 101 uses the RAM 102 as a working area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104.

Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the contact-separation motor 32*d*, the crimper pivot motor 56, the liquid applier movement motor 37, the edge binder movement motor 50, the position detection sensor 40*a*, the first liquid amount detection sensor 43*a*, the second liquid amount detection sensor 52*a*, and a setting detection sensor 532 to the common bus 109.

The controller 100 controls, via the I/F 105, the operations of the contact-separation motor 32*d*, the crimper pivot motor 56, the liquid applier movement motor 37, and the edge binder movement motor 50. The controller 100 acquires, via the I/F 105, the detection results from the position detection sensor 40*a*, the first liquid amount detection sensor 43*a*, the second liquid amount detection sensor 52*a*, and the setting detection sensor 532.

Although FIG. 8 illustrates only the components related to the edge binder 25 that performs the edge binding, the components related to the saddle binder 28 that performs the saddle binding are also controlled by the controller 100.

As illustrated in FIG. 1, the image forming apparatus 2 includes the control panel 110 as an input device.

The control panel 110 includes an operation device that receives instructions from a user and a display as a notification device that notifies the user of information. The operation device includes, for example, hard keys and a touch screen overlaid on the display. The control panel 110 acquires information from the user through the operation unit and provides the information to the user through the display.

A specific example of the notification unit is not limited to the display and may be a light emitting diode (LED) lamp or a speaker.

The post-processing apparatus 3 may include a control panel 110 similar to the above-described control panel 110 of the image forming apparatus 2.

As described above, the post-processing apparatus 3 implements the function of performing operation control related to the liquid application by software (control programs) executed by the CPU 101 with hardware resources included in the controller 100 as a control unit.

Operations of Liquid Application and Crimp Binding

A description is given below of the operations of the liquid applier 31 and the crimper 32 included in the edge binder 25 as a medium processing device, with reference to FIGS. 9A, 9B, 9C, 9D and 9E.

Figure 9A:
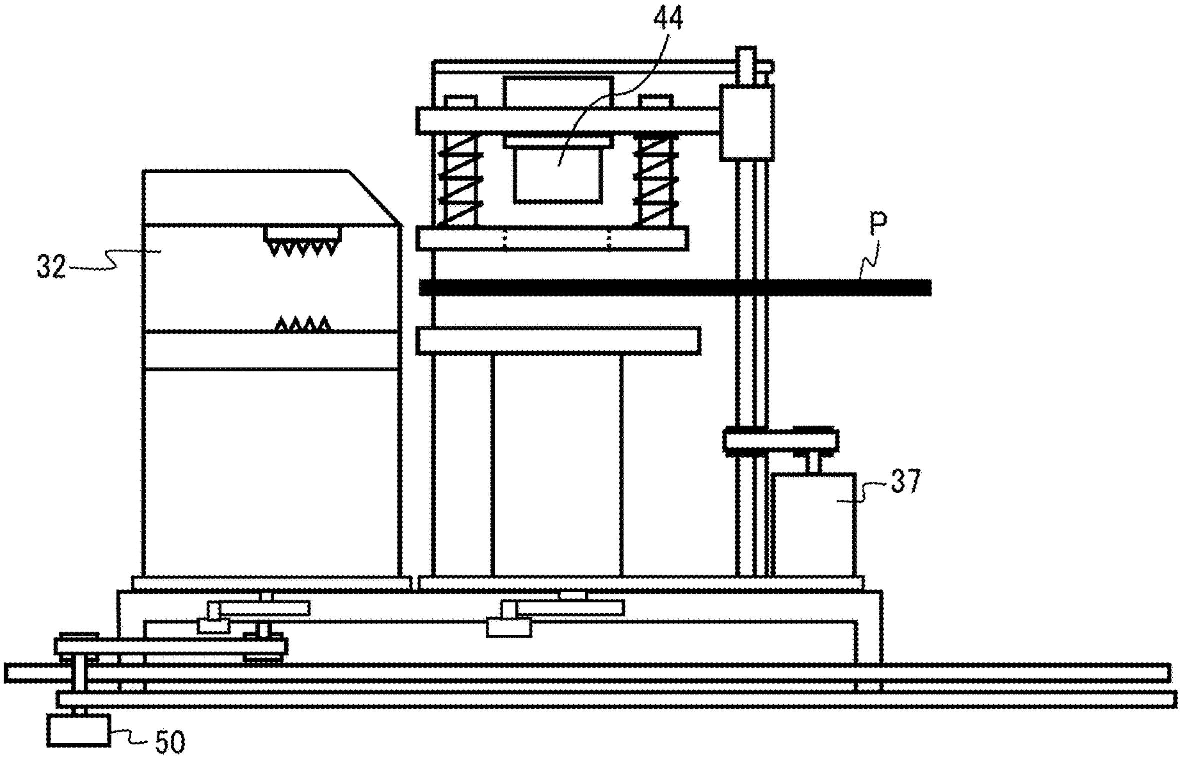
FIGS. 9A, 9B, 9C, 9D and 9E are diagrams illustrating a liquid applying operation and a crimp binding operation by an edge binder.

As illustrated in FIG. 9A, the sheet P is conveyed to the medium receiving position of the liquid application member 44 at a position where the liquid application member 44 is lifted.

Figure 9B:
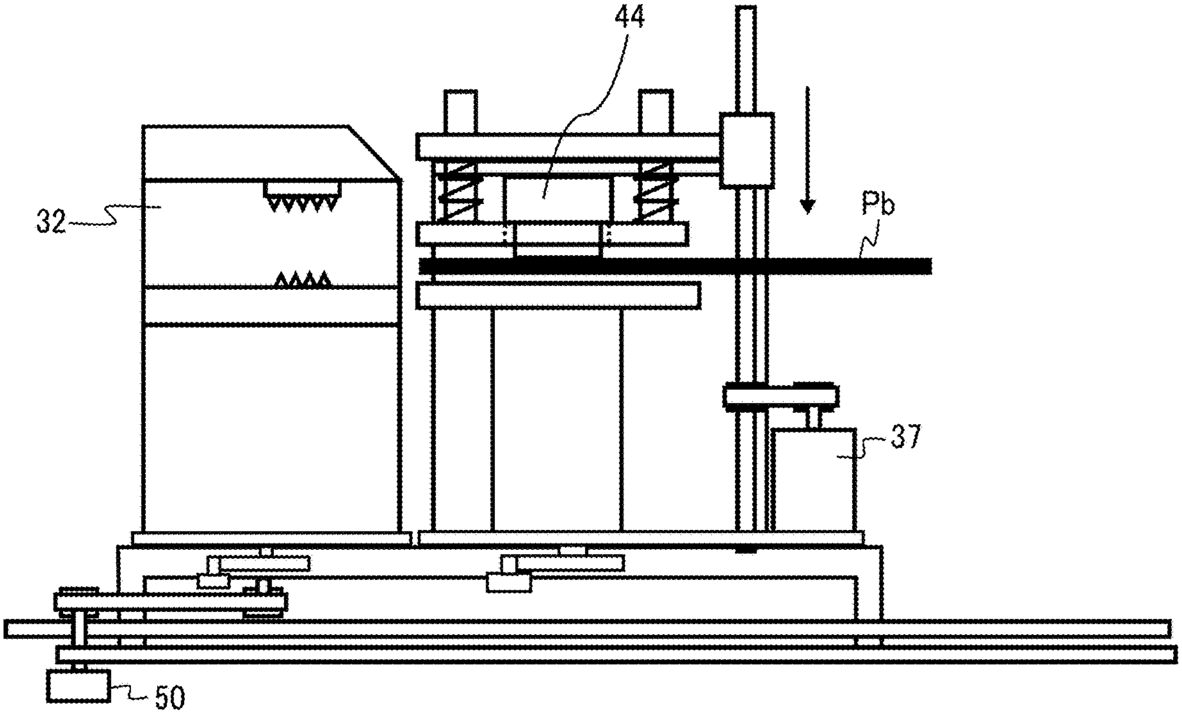

As illustrated in FIG. 9B, the liquid application member 44 moves in the vertical direction by the liquid applier movement motor 37. With this action, the liquid application member 44 containing liquid presses the sheet P to perform liquid application on the sheet P.

Figure 9C:
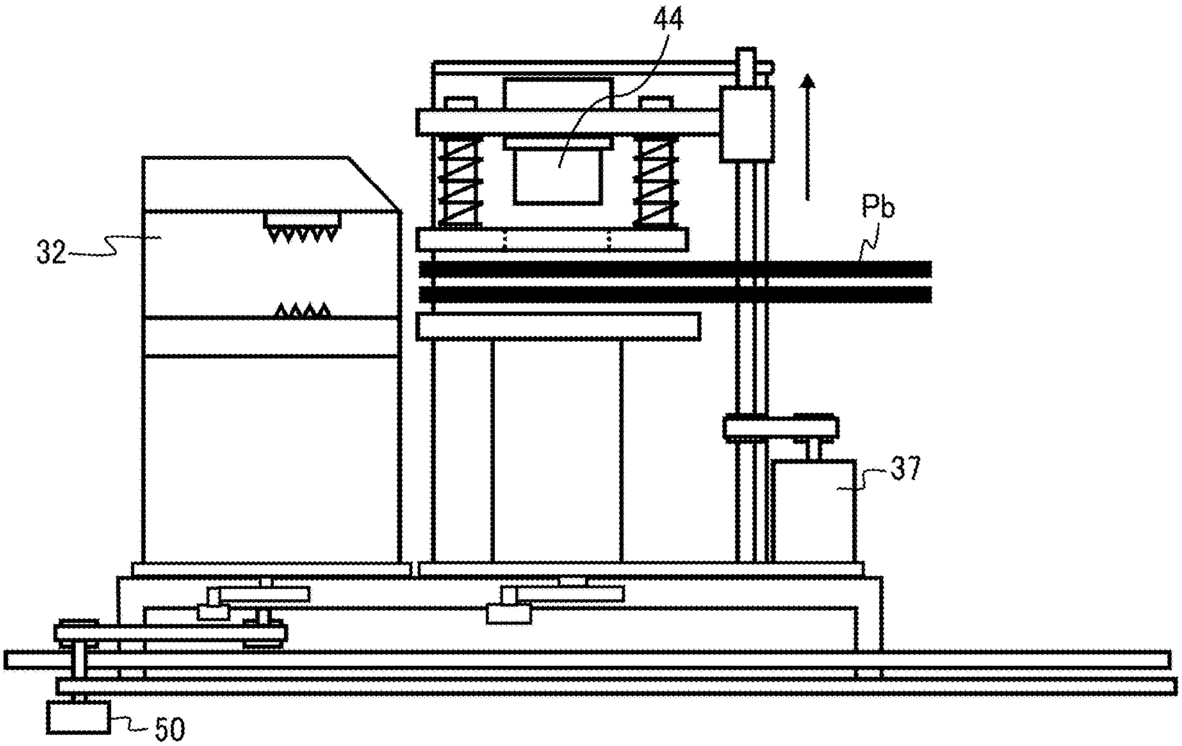

Subsequently, as illustrated in FIG. 9C, the liquid application member 44 moves upward to convey the subsequent sheet P to a medium receiving position.

Figure 9D:
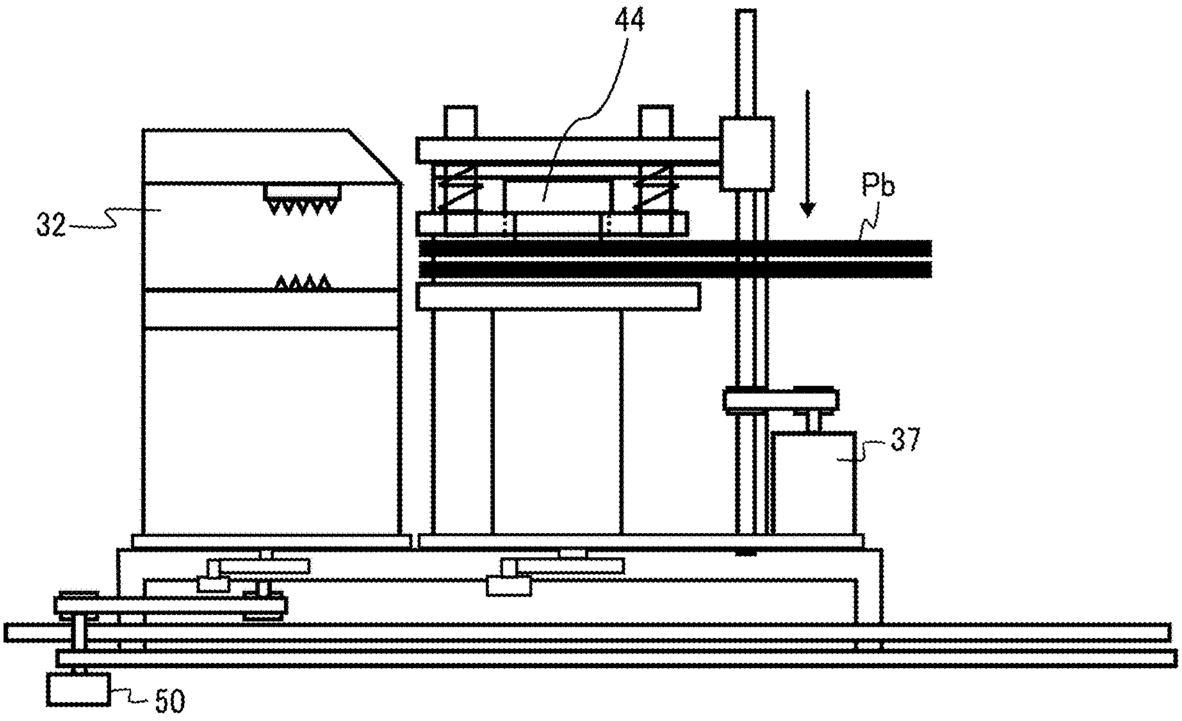

When the subsequent sheet P to be applied with liquid is conveyed to the medium receiving position, the operations illustrated in FIGS. 9A and 9B are repeated. The operations of FIGS. 9A, 9B and 9C are repeated until the last sheet P to be applied with liquid is conveyed, as illustrated in FIG. 9D.

Figure 9E:
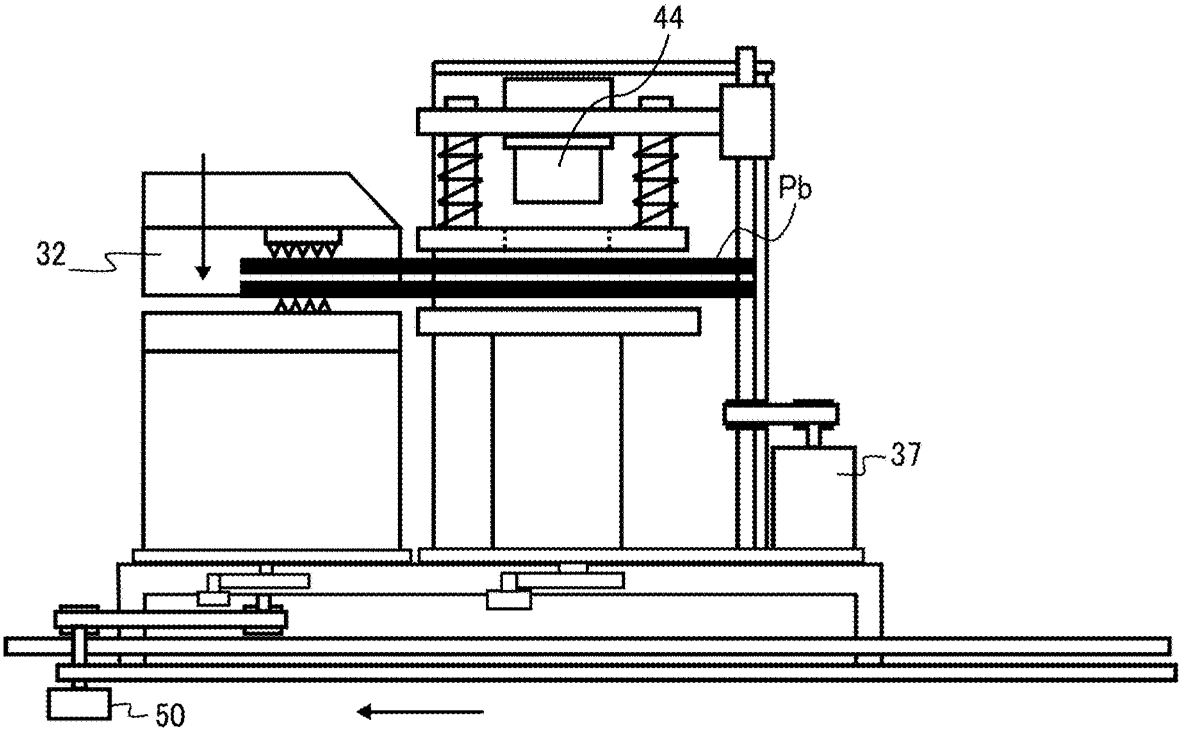

As illustrated in FIG. 9E, the liquid application member 44 and the crimper 32 move in the main scanning direction by the edge binder movement motor 50, and the binding operation of the sheet bundle Pb to the position of the crimper 32. Then, the crimper 32 performs the sheet binding operation, and then the sheet bundle Pb is ejected.

First Embodiment of Operations of Liquid Application and Crimp Binding

A description is given below of the operations of liquid application and crimp binding executable in the edge binder 25 included in the post-processing apparatus 3 according to the first embodiment.

The post-processing apparatus 3 according to the present embodiment stores in advance, in the ROM 103 of the controller 100, a pre-trained model by machine learning using training data.

The pre-trained model stored in the ROM 103 is generated by the correlation of the characteristic of the sheet P (medium characteristic), the characteristic of liquid used for liquid application (liquid characteristic), the liquid application amount in liquid application, and the pressing force as the physical pressure in the crimper 32 when performing the crimp binding, as the training data.

In other words, the post-processing apparatus 3 according to the present embodiment uses a pre-trained model generated by machine learning using, as training data, datasets in which the measured value of a pressing force and the correct answer label (ground truth label) when actually performing the crimp binding operation are associated with a combination of a feature amount of the sheet P (for example, size and thickness of the sheet P) used in the crimp binding operation and a feature amount of liquid applied to the sheet P.

In the present embodiment, "water" is used as an example of the liquid used for liquid application. Accordingly, "hardness", which is one of the characteristics of water, is used as the feature amount.

Figure 10:
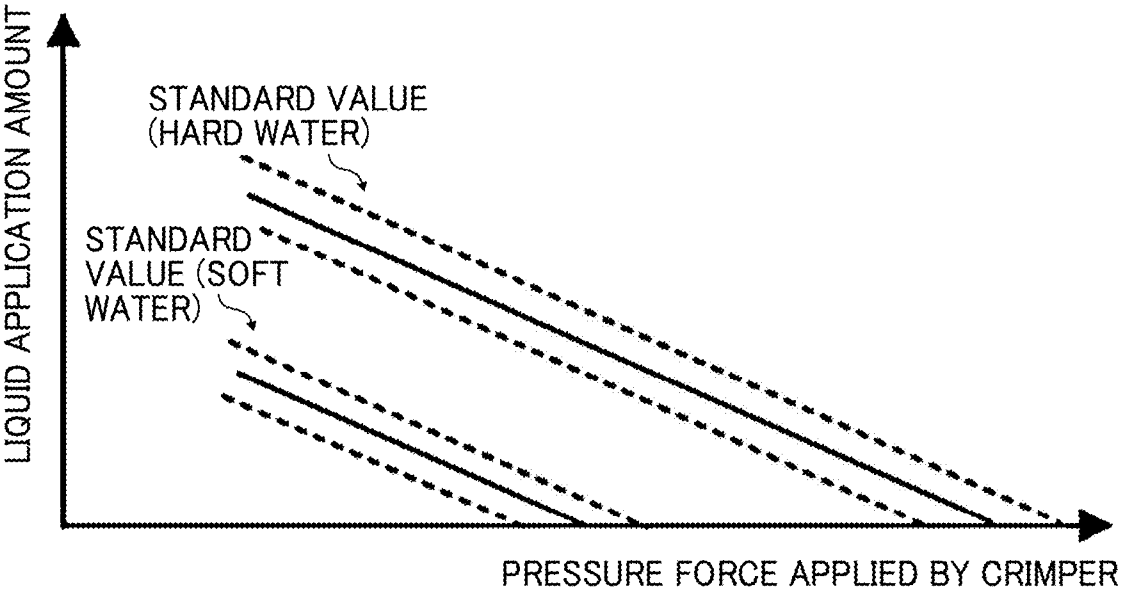
FIG. 10 is a diagram illustrating a correlation between a pressing force and a liquid application amount according to a first embodiment of the present disclosure.

For example, as illustrated in FIG. 10, while the pressing force by the crimper 32 and the liquid application amount (water addition amount) by liquid application are correlated and changed, a combination of the standard value (correct answer label) of each characteristic of the liquid is prepared for each characteristic of the sheet P. By so doing, a machine learning model (pre-trained model) is generated in response to the above-described operations.

In FIG. 10, the solid line indicates the mean value of the standard values (correct answer labels), and the dotted line indicates the acceptable error range.

Figure 11:
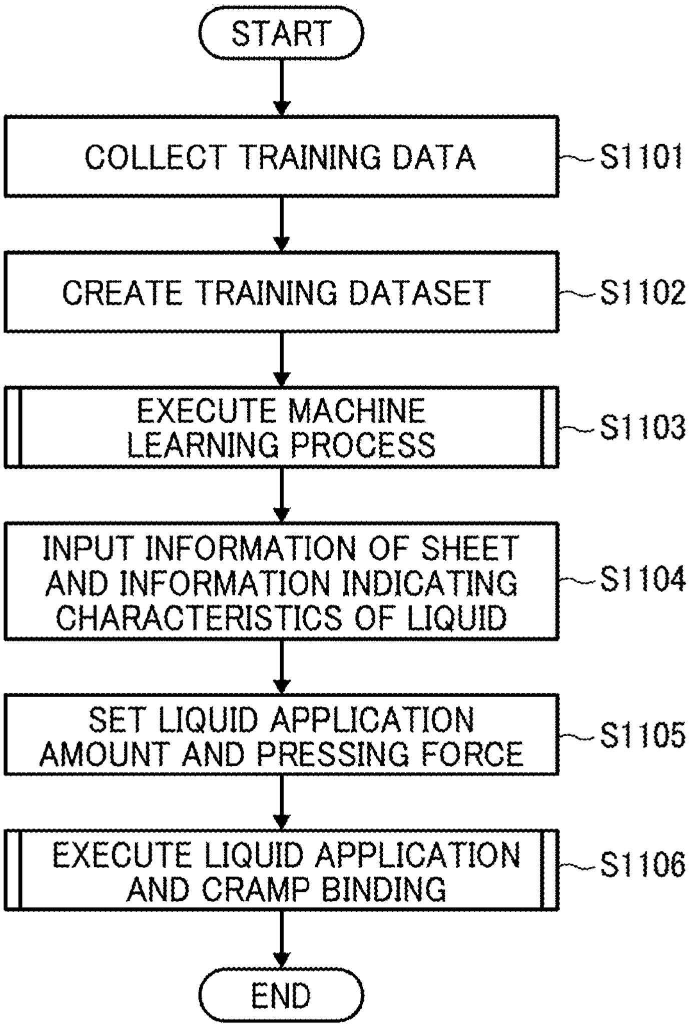
FIG. 11 is a flowchart of a flow of liquid application binding process according to the first embodiment of the present disclosure.

The pre-trained model is executed along the flow illustrated in, for example, a flowchart of FIG. 11. In other words, the liquid application and crimp binding operation is performed on the actual sheet bundle Pb with a specific pressing force, with a combination of different types of sheets P and different hardness of water (liquid). Then, a calculation is performed on the binding strength (fastening degree) of the sheet bundle Pb that is bound as a result of the liquid application operation and the crimp binding operation, so as to collect the training data (step S1101). The training data is collected for each type of sheet P.

The correct answer label is assigned to the training data collected in step S1101 if the binding strength is sufficient, and the target value of the pressing force is assigned to the training data. By so doing, a training dataset is created that includes the type of sheet P and the hardness of water as the feature amounts and the pressing forces corresponding to the respective combinations as target values (step S1102).

Machine learning is executed with a machine learning process using the training dataset created in step S1102, and a pre-trained model is generated (step S1103).

When the post-processing apparatus 3, in which the pre-trained model is implemented, executes a job including the liquid application operation and the crimp binding operation, the information (e.g., the type and the thickness) of the sheet P and the information indicating the characteristics of the liquid is input via the control panel 110 (step S1104).

In the present embodiment, "water" is used as an example of the liquid used for liquid application. Accordingly, "hardness", which is one of the characteristics of water, is input.

The liquid characteristic data associated with the water intake area and the hardness of water may be stored in advance in the ROM 103 of the controller 100 as a process control amount setting unit, and when the water intake area of the water (liquid) in the post-processing apparatus 3 is input in step S1104, the hardness of water may be specified with reference to the liquid characteristic data associated with the water intake area and the hardness of water.

The liquid application amount and the pressing force to be applied are set based on the information input in step S1104 (step S1105).

Then, the liquid application operation and the crimp binding operation are performed based on the liquid application amount and the pressing force set in step S1105 (step S1106).

Due to the series of the above-described operations, the binding operation can be performed with the pressing force suitable for the hardness of water. In addition, since the pre-trained model based on the training dataset for each type of the sheet P is used, the crimp binding operation can be performed with the pressing force suitable for the sheet P.

The processes from step S1101 to step S1103 may be executed by using hardware resources different from the hardware resources of the post-processing apparatus 3 to generate a pre-trained model.

In this case, the pre-trained model generated by machine learning may be implemented to the post-processing apparatus 3 before step S1104 is executed.

Further, the binding strength of the sheet bundle Pb generated based on the liquid application amount and the pressing force set in step S1105 may be evaluated and included in the training dataset generated in step S1102, thereby performing so-called reinforcement learning. In this case, the update is constantly performed within the acceptable error range within the dotted line of the graph illustrated in FIG. 10.

Further, the pre-trained model may be stored in a cloud service, and the post-processing apparatus 3 may access the cloud service via a communication network to set the liquid application amount and the pressing force in step S1105.

Second Embodiment of Operations of Liquid Application and Crimp Binding

A description is given below of the operations of liquid application and crimp binding executable in the edge binder 25 included in the post-processing apparatus 3 according to a second embodiment.

Figure 12:
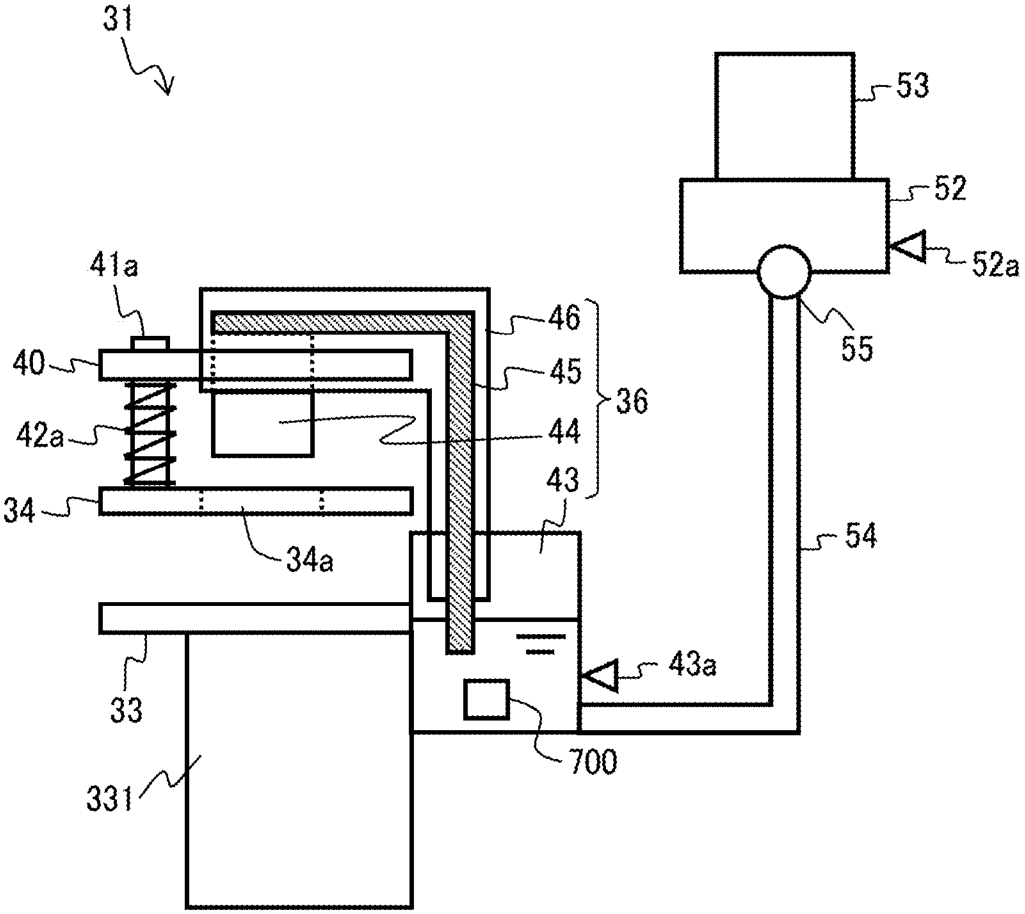
FIG. 12 is a schematic diagram illustrating an edge binder according to a second embodiment of the present disclosure, viewed from the main scanning direction.

As illustrated in FIG. 12, the post-processing apparatus 3 according to the present embodiment is based on the premise that a thermometer 700 that detects the temperature of the liquid (water) used for liquid application is installed in the first liquid storage tank 43.

Further, as in the first embodiment, it is assumed that a pre-trained model generated by machine learning using a training data is stored in advance in the ROM 103 in the controller 100. The pre-trained model stored in the ROM 103 is generated by the correlation of the characteristic of the sheet P, the characteristic of liquid used for liquid application, the liquid application amount in liquid application, and the pressing force in the crimper 32 when performing the crimp binding, as the training data. In the present embodiment, the specification of the liquid used for liquid application includes "temperature".

Figure 13:
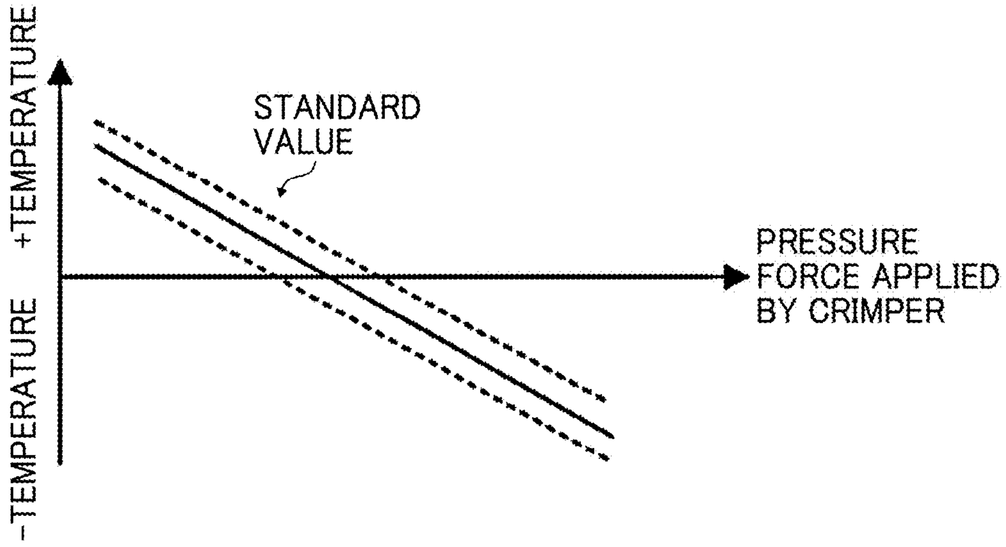
FIG. 13 is a diagram illustrating a correlation between a pressing force and a liquid temperature according to the second embodiment of the present disclosure.

For example, as illustrated in FIG. 13, while the pressing force by the crimper 32 and the temperature of liquid used for liquid application are correlated and changed, a combination of the standard value (correct answer label) of each temperature characteristic of the liquid is prepared for each characteristic of the sheet P. By so doing, a machine learning model (pre-trained model) is generated in response to the above-described operations. In FIG. 13, the solid line indicates the mean value of the standard values (correct answer labels), and the dotted line indicates the acceptable error range.

The pre-trained model is generated by executing steps S1101 to S1103 described above. In other words, the liquid application operation and the crimp binding operation are performed on the actual sheet bundle Pb, with a combination of different types of sheets P and different hardness of water (liquid) and temperature. Then, the pre-trained model is generated based on the training data obtained by calculating the binding strength (fastening degree) of the sheet bundle Pb that is bound as a result of the liquid application operation and the crimp binding operation.

Then, the temperature detected by the thermometer 700 is included in the input data exemplified in step S1104, and steps S1105 and S1106 are executed.

Due to such a configuration, the binding strength that is more stable than in the first embodiment can be enhanced.

Third Embodiment of Operations of Liquid Application and Crimp Binding

A description is given below of the operations of liquid application and crimp binding executable in the edge binder 25 included in the post-processing apparatus 3 according to a third embodiment.

As the number of times of use of the liquid application member 44 increases, due to a change such as a change in which the shape of the tip portion becomes tattered due to, for example, deterioration over time, even if the liquid application and the crimp binding are executed with the liquid application amount and the pressing force that are estimated using the pre-trained model as in step S1105 described in the first embodiment, an assumed binding strength is not obtained. This is because the liquid application is performed as set due to the deterioration of the liquid application member 44.

Figure 14:
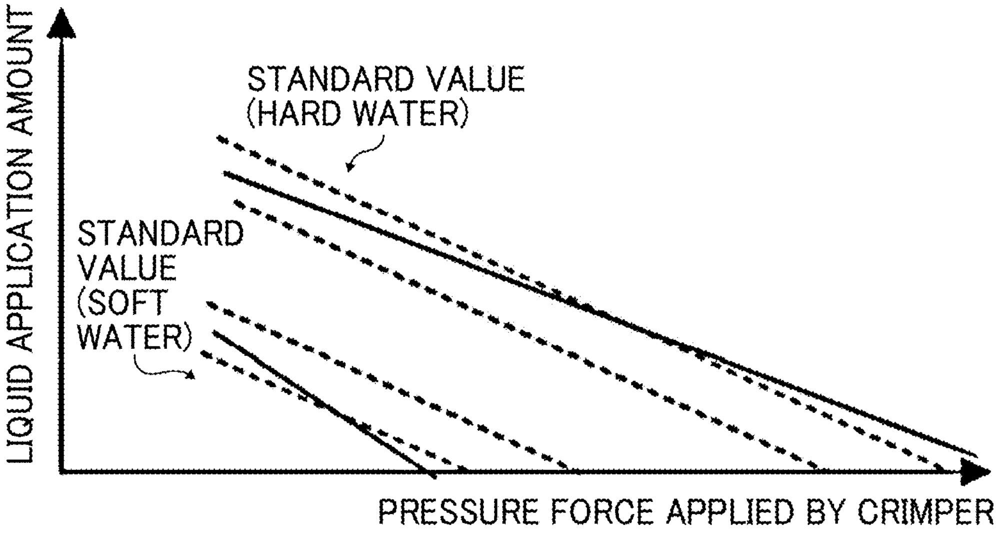
FIG. 14 is a diagram illustrating a correlation between a pressing force and a liquid application amount according to a third embodiment of the present disclosure.

In the present embodiment, when a data model outside the error range is generated as illustrated in FIG. 14, the user is prompted to replace the liquid application member 44 via the control panel 110 as a notification device.

Figure 15:
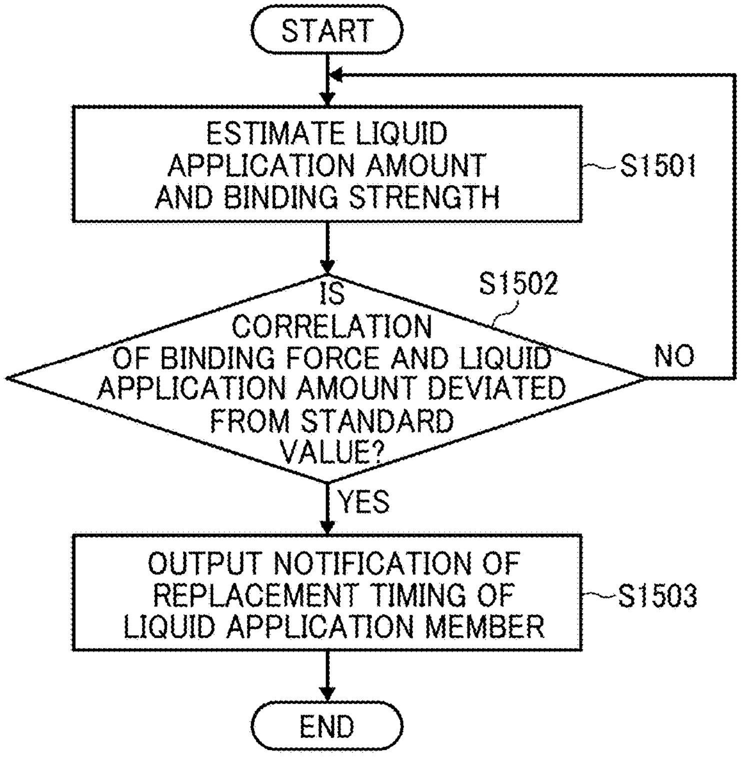
FIG. 15 is a flowchart of a flow of liquid application binding process according to the third embodiment of the present disclosure.

FIG. 15 is a flowchart of the flow of a replacement time notifying operation of the liquid application member 44.

First, in the first embodiment and the second embodiment described above, when the setting of the liquid application amount (water addition amount) and the binding strength is executed by the pre-trained model (step S1105), the liquid application amount and the binding strength are estimated (step S1501).

The controller 100 determines whether the relation of the liquid application amount and the binding strength estimated in step S1501 is deviated from the standard value as illustrated in FIG. 14 (step S1502).

When the relation of the liquid application amount and the pressing force estimated in step S1501 is not deviated from the standard value (NO in step S1502), the process returns to step S1501, and the process is repeated each time the job is completed.

When the relation of the liquid application amount and the pressing force estimated in step S1501 is deviated from the standard value as illustrated in FIG. 14 (YES in step S1502), the controller 100 outputs a notification indicating that the liquid application member 44 has reached the replacement timing via the control panel 110. Then, the controller 100 prompts the user to replace the liquid application member 44 (step S1503).

According to the present embodiment, the state of the liquid application member 44 that changes over time is monitored, and the replacement of the liquid application member 44 is prompted at a timing at which the liquid application amount and the binding pressure estimated in the pre-trained model is deviated from the standard values, and therefore, and the quality of the binding strength can be maintained.

Fourth Embodiment of Operations of Liquid Application and Crimp Binding

A description is given below of the operations of liquid application and crimp binding executable in the edge binder 25 included in the post-processing apparatus 3 according to a third embodiment.

In the liquid application member 44 having the liquid (water) permeated to the tip end for the liquid application, paper dust generated by scraping the sheet P by friction may be attached to the tip in particular. The degree of adhesion of paper dust increases cumulatively in accordance with the number of times of liquid application. For this reason, as the amount of adhesion of paper dust increases, there is a possibility that the amount of liquid application to the subsequent sheet P does not fall within the standard value due to the increase in the amount of adhesion of paper dust.

Figure 16:
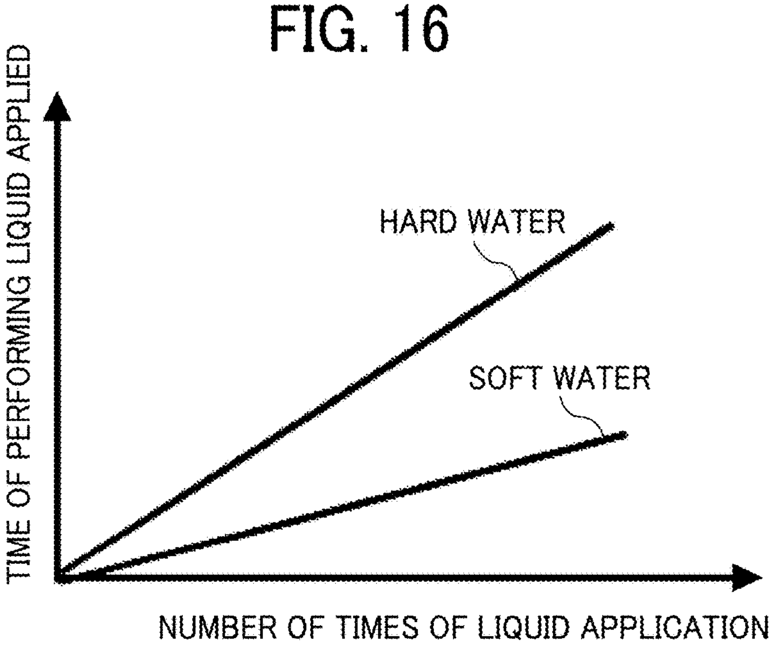
FIG. 16 is a diagram illustrating a correlation between the number of times of liquid application and a liquid application amount according to a fourth embodiment of the present disclosure.

In order to avoid such a situation, as illustrated in FIG. 16, the training data including the correlation data of the number of times of liquid application (number of times of water application) by the liquid application member 44 and the pressing time of the liquid application member 44 (the contact time to the sheet P corresponding to the "pressing time of application of water) per the characteristic of the sheet P is prepared per the liquid property (hardness of water), so as to generate the machine learned model (pre-trained model) with the training data. In FIG. 16, the solid line indicates the mean value of the standard values (correct answer labels), and the dotted line indicates the acceptable error range.

When a job including the liquid application and the crimp binding is executed, a control that changes the setting of the pressing time of the liquid application member 44 is added, so that the replacement of the liquid application member 44 is prompted when a given binding strength is not obtained even with the changed liquid application time. By so doing, a more optimal liquid application and crimp binding can be performed.

Figure 17:
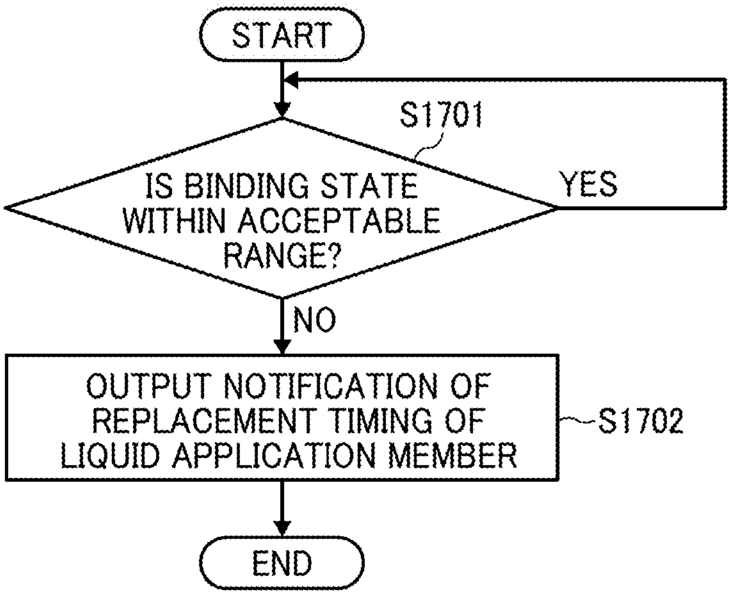
FIG. 17 is a flowchart of a flow of liquid application binding process according to the fourth embodiment of the present disclosure.

FIG. 17 is a flowchart of the flow of a replacement timing notifying operation based on the result of the binding operation due to the change of the liquid application time of the liquid application member 44.

In the first embodiment and the second embodiment described above, when the setting of the liquid application amount and the pressing force is executed by the pre-trained model (step S1105), the controller 100 determines whether the binding state is within the allowable range (step S1701).

In step S1701, when the binding state is within the acceptable range (YES in step S1701), the process is repeated each time the job is completed.

In step S1701, when the binding state is not within the acceptable range (NO in step S1701), the controller 100 outputs a notification indicating that the liquid application member 44 has reached the replacement timing via the control panel 110. Then, the controller 100 prompts the user to replace the liquid application member 44 (step S1702).

According to the present embodiment, the deterioration of the liquid application member 44 that changes over time is timely notified, and the quality of the binding strength can be maintained.

The sheet processing apparatus according to the present embodiment described above can estimate a preferable liquid application amount and binding force from information of a sheet P (e.g., thickness and type) and the type of liquid (hardness in the case of water) used for liquid application, by a pre-trained model for crimp binding obtained by machine learning using given training data in advance.

The pre-trained model for crimp binding according to the present embodiment is generated by the machine learning process using the data, as the training data, indicating the correlation of the information of the sheet P (e.g., thickness and type), the type of liquid (hardness in the case of water) used for liquid application, the application amount of liquid by liquid application, pressure force by the crimper 32, and the fastening force.

In other words, with the sheet processing apparatus (medium processing apparatus) according to the present embodiment, when the information of the sheet P (e.g., thickness and type) and the type of liquid used for liquid application (e.g., hardness) are set by the user, the binding operation with the application amount of liquid by liquid application estimated by the pre-trained model and the liquid application by pressure force can be performed.

Accordingly, with the sheet processing apparatus (medium processing apparatus) according to the present embodiment, the fastening force of the sheet bundle Pb prepared by the crimp binding operation can be enhanced, regardless of the type of the sheet P. The fastening force of the sheet bundle Pb refers to the difficulty of separation of the sheets P of the sheet bundle Pb.

Embodiments of the present disclosure are not limited to the above-described embodiments and modifications, and numerous additional modifications and variations are possible in light of the teachings. The technical contents included in the technical ideas described in the appended claims are included within the technical scope of the appended claims. The above-described embodiments and modifications are some examples, and various modifications and variations can be practiced from such examples by those skilled in the art. Such embodiments and variations thereof are included in the scope and gist of the embodiments of the present disclosure and are included in the embodiments described in claims and the equivalent scope thereof.

The control method described above may be implemented by, for example, a program. In other words, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Aspects of the present disclosure are, for example, as follows.

Aspect 1

In Aspect 1, a medium processing apparatus performs a given operation on a bundle of media including at least one medium on which liquid application has been performed. The medium processing apparatus includes a liquid applier, a medium processing device, an input device, and a controller. The liquid applier performs the liquid application with a liquid application member to which liquid is permeated. The medium processing device performs a given operation. The input device receives an input of a medium characteristic that specifies the type of a medium and a liquid characteristic that specifies liquid to be used for the liquid application. The controller controls the operations of the liquid application amount and the medium processing device, based on the medium characteristic and the liquid characteristic input by the input device. The controller has a pre-trained model generated by machine learning with training data including a correlation of a medium characteristic that separately specifies the types of multiple media including the medium, a liquid characteristic that specifies liquid to be used for liquid application, a liquid application amount that is an amount of liquid to be applied to the medium in the liquid application, and a physical pressure that is applied to the medium in the given operation. The controller includes a process control amount setting unit that sets an optimum amount of liquid application and an optimum strength of the physical pressure by the pre-trained model to the medium characteristic and the liquid characteristic input by the input device.

Aspect 2

In Aspect 2, in the medium processing apparatus according to Aspect 1, in the training data used for the pre-trained model, the medium characteristic includes at least one of a thickness of the medium or a type of the medium, and the liquid characteristic includes at least one of a hardness of the liquid or a temperature of the liquid. The process control amount setting unit sets the liquid application amount and the strength of the physical pressure, in response to an input of at least one of the thickness of the medium or the type of the medium and at least one of the hardness of the liquid or the temperature of the liquid by the pre-trained model.

Aspect 3

In Aspect 3, the medium processing apparatus according to Aspect 1 or 2 further includes a notification device that notifies a user of whether the liquid application amount and the strength of the physical pressure set via the pre-trained model are appropriate. The controller notifies the user of a replacement of the liquid application member when the liquid application amount and the degree of the strength of the physical pressure set by the process control amount setting unit exceed a given error range of a given standard value.

Aspect 4

In Aspect 4, the medium processing apparatus according to Aspect 1 or 2 further includes a notification device that notifies a user of whether the liquid application amount and the strength of the physical pressure set via the pre-trained model are appropriate. The controller determines whether the liquid application amount set by the process control amount setting unit is appropriate based on a number of times of liquid application, and notifies the user of a replacement of the liquid application member when the liquid application amount exceeds a given error range of a given standard value.

Aspect 5

In Aspect 5, an image forming system includes an image forming apparatus to form an image on each medium of multiple media, and the medium processing apparatus according to Aspect 1 to crimp and bind the multiple media having the image on each medium.

Aspect 6

In Aspect 6, a medium processing apparatus includes a liquid applier, a medium processing device, an input device, and circuitry. The liquid applier applies liquid to a part of a medium to perform a liquid application. The medium processing device performs a given operation on a bundle of media including the medium subjected to the liquid application. The input device inputs at least a medium characteristic that individually specifies types of media including the medium, and a liquid characteristic that specifies a liquid used in the liquid application. The circuitry is to employ a pre-trained model trained on correlation relationships, as training data, among the medium characteristic, the liquid characteristic, a liquid application amount applied to the medium by the liquid application, and a physical pressure applied to the medium in the given operation, to obtain a pre-trained application amount and a pre-trained physical pressure based on the medium characteristic and the liquid characteristic; set the pre-trained application amount and the pre-trained physical pressure obtained by the pre-trained model; and control the liquid applier and the medium processing device to perform the liquid application and the given operation according to the pre-trained application amount and the pre-trained physical pressure.

Aspect 7

In Aspect 7, in the medium processing apparatus according to Aspect 6, the circuitry is further to employ the pre-trained model based on the medium characteristic including at least one of a thickness of the medium or a type of the medium, and the liquid characteristic including at least one of a hardness of the liquid or a temperature of the liquid, to obtain a pre-trained application amount and a pre-trained physical pressure.

Aspect 8

In Aspect 8, the medium processing apparatus according to Aspect 6 or 7, the liquid applier includes a liquid application member. The circuitry is further to determine whether the pre-trained application amount and the pre-trained physical pressure are in an allowable range, and output an instruction to replace the liquid application member when the pre-trained application amount and the pre-trained physical pressure exceed the allowable range.

Aspect 9

In Aspect 9, the medium processing apparatus according to Aspect 6 or 7, the liquid applier includes a liquid application member. The circuitry is further to determine whether the pre-trained application amount is in an allowable range based on a number of times of the liquid application, and output an instruction to replace the liquid application member when the pre-trained application amount exceeds the allowable range.

Aspect 10

In Aspect 10, an image forming system includes an image former, a liquid applier, a medium processing device, an input device, and circuitry. The image former forms an image on a medium. The liquid applier applies liquid to a part of the medium on which the image is formed by the image former. The medium processing device performs a given operation on a bundle of media including the medium subjected to liquid application by the liquid applier. The input device inputs at least a medium characteristic that individually specifies types of media including the medium, and a liquid characteristic that specifies a liquid used in the liquid application. The circuitry is to employ a pre-trained model trained on correlation relationships, as training data, among the medium characteristic, the liquid characteristic, a liquid application amount applied to the medium by the liquid application, and a physical pressure applied to the medium in the given operation, to obtain a pre-trained application amount and a pre-trained physical pressure based on the medium characteristic and the liquid characteristic; set the pre-trained application amount and the pre-trained physical pressure obtained by the pre-trained model; and control the liquid applier and the medium processing device to perform the liquid application and the given operation according to the pre-trained application amount and the pre-trained physical pressure.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A medium processing apparatus comprising:

a liquid applier to apply liquid to a part of a medium to perform a liquid application;

a medium processing device to perform a given operation on a bundle of media including the medium subjected to the liquid application;

an input device to input at least:

a medium characteristic that individually specifies types of media including the medium; and a liquid characteristic that specifies a liquid used in the liquid application; and circuitry configured to:

employ a pre-trained model trained on correlation relationships, as training data, among:

the medium characteristic;

the liquid characteristic;

a liquid application amount applied to the medium by the liquid application; and a physical pressure applied to the medium in the given operation, to obtain a pre-trained application amount and a pre-trained physical pressure based on the medium characteristic and the liquid characteristic;

set the pre-trained application amount and the pre-trained physical pressure obtained by the pre-trained model; and control the liquid applier and the medium processing device to perform the liquid application and the given operation according to the pre-trained application amount and the pre-trained physical pressure.

2. The medium processing apparatus according to claim 1, wherein the circuitry is further configured to:

employ the pre-trained model trained on correlation relationships, as the training data, between:

the medium characteristic including at least one of a thickness of the medium or a type of the medium; and the liquid characteristic including at least one of a hardness of the liquid or a temperature of the liquid, to obtain a pre-trained application amount and a pre-trained physical pressure.

3. The medium processing apparatus according to claim 1, wherein the liquid applier includes a liquid application member, and the circuitry is further configured to:

determine whether the pre-trained application amount and the pre-trained physical pressure are in an allowable range; and output an instruction to replace the liquid application member when the pre-trained application amount and the pre-trained physical pressure exceed the allowable range.

4. The medium processing apparatus according to claim 1, wherein the liquid applier includes a liquid application member, and the circuitry is further configured to:

determine whether the pre-trained application amount is in an allowable range based on a number of times of the liquid application; and output an instruction to replace the liquid application member when the pre-trained application amount exceeds the allowable range.

5. An image forming system comprising:

an image former to form an image on a medium;

a liquid applier to apply liquid to a part of the medium on which the image is formed by the image former;

a medium processing device to perform a given operation on a bundle of media including the medium subjected to liquid application by the liquid applier;

an input device to input at least:

a medium characteristic that individually specifies types of media including the medium; and a liquid characteristic that specifies a liquid used in the liquid application; and circuitry configured to:

employ a pre-trained model trained on correlation relationships, as training data, among:

the medium characteristic;

the liquid characteristic;

a liquid application amount applied to the medium by the liquid application; and a physical pressure applied to the medium in the given operation, to obtain a pre-trained application amount and a pre-trained physical pressure based on the medium characteristic and the liquid characteristic;

set the pre-trained application amount and the pre-trained physical pressure obtained by the pre-trained model; and control the liquid applier and the medium processing device to perform the liquid application and the given operation according to the pre-trained application amount and the pre-trained physical pressure.

* * * * *